United States Patent
Yoshii

(10) Patent No.: US 12,478,379 B2
(45) Date of Patent: Nov. 25, 2025

(54) MEDICAL DEVICE AND METHOD OF RELEASING CLIP UNIT

(71) Applicant: OLYMPUS CORPORATION, Hachioji (JP)

(72) Inventor: Toshihiro Yoshii, Hirosaki (JP)

(73) Assignee: OLYMPUS CORPORATION, Tokyo (JP)

(*) Notice: Subject to any disclaimer, the term of this patent is extended or adjusted under 35 U.S.C. 154(b) by 860 days.

(21) Appl. No.: 17/342,653

(22) Filed: Jun. 9, 2021

(65) Prior Publication Data

US 2021/0290240 A1 Sep. 23, 2021

Related U.S. Application Data

(63) Continuation of application No. PCT/JP2018/045421, filed on Dec. 11, 2018.

(51) Int. Cl.
*A61B 17/122* (2006.01)

(52) U.S. Cl.
CPC .................. *A61B 17/122* (2013.01)

(58) Field of Classification Search
CPC ........ A61B 17/122; A61B 2017/00292; A61B 17/1227; A61B 2017/00477; A61B 17/1285; A61B 17/083; A61B 2090/037
See application file for complete search history.

(56) References Cited

U.S. PATENT DOCUMENTS

| | | | | |
|---|---|---|---|---|
| 3,958,576 A | * | 5/1976 | Komiya | A61B 17/10 24/537 |
| 4,681,107 A | * | 7/1987 | Kees, Jr. | A61B 17/1285 606/142 |
| 4,706,668 A | * | 11/1987 | Backer | A61B 17/1285 606/142 |
| 5,569,274 A | * | 10/1996 | Rapacki | A61B 18/1442 606/151 |
| 5,766,184 A | * | 6/1998 | Matsuno | A61B 17/122 606/151 |
| 6,386,496 B1 | * | 5/2002 | Lai | E05C 19/022 248/222.12 |
| 6,464,710 B1 | * | 10/2002 | Foster | A61B 17/1285 606/157 |
| 8,152,822 B2 | * | 4/2012 | Gayzik | A61B 17/1227 606/151 |

(Continued)

FOREIGN PATENT DOCUMENTS

| CN | 202699218 U | * 1/2013 | ......... A61B 17/1285 |
|---|---|---|---|
| JP | 2008-526376 A | 7/2008 | |

(Continued)

OTHER PUBLICATIONS

Mar. 5, 2019 International Search Report issued in International Patent Application No. PCT/JP2018/045421.

*Primary Examiner* — Tan-Uyen T Ho
*Assistant Examiner* — Osama Nemer
(74) *Attorney, Agent, or Firm* — Oliff PLC

(57) ABSTRACT

A medical device that includes a clip unit; an operation wire for operating the clip unit; a link capable of linking the clip unit and the operation wire such that the clip unit is engaged with the operation wire; and a sheath. The link can be moved to release an engagement between the operation wire and the clip unit.

18 Claims, 20 Drawing Sheets

(56) References Cited

U.S. PATENT DOCUMENTS

| | | | |
|---|---|---|---|
| 8,172,859 B2 * | 5/2012 | Matsuno | A61B 17/1285 606/151 |
| 8,545,519 B2 * | 10/2013 | Aguirre | A61B 17/10 606/151 |
| 8,685,048 B2 * | 4/2014 | Adams | A61B 17/1227 606/157 |
| 8,690,899 B2 * | 4/2014 | Kogiso | A61B 17/1285 606/151 |
| 9,687,248 B2 * | 6/2017 | Satake | A61B 17/122 |
| 9,949,740 B2 * | 4/2018 | Satake | A61B 17/122 |
| 10,610,237 B2 * | 4/2020 | Estevez | A61B 17/122 |
| 10,639,044 B2 * | 5/2020 | Prior | A61B 17/1222 |
| 10,820,904 B2 * | 11/2020 | Ryan | A61B 17/1285 |
| 11,071,552 B2 * | 7/2021 | Saenz Villalobos | A61B 17/128 |
| 11,213,300 B2 * | 1/2022 | Lehtinen | A61B 17/083 |
| 11,364,033 B2 * | 6/2022 | Dinges | A61B 17/12022 |
| 2002/0045909 A1 * | 4/2002 | Kimura | A61B 17/083 606/151 |
| 2003/0069592 A1 * | 4/2003 | Adams | A61B 17/1227 606/142 |
| 2004/0147943 A1 * | 7/2004 | Kobayashi | A61B 34/76 606/158 |
| 2005/0143767 A1 * | 6/2005 | Kimura | A61B 50/30 606/158 |
| 2006/0155308 A1 * | 7/2006 | Griego | A61B 17/1285 606/142 |
| 2006/0271072 A1 * | 11/2006 | Hummel | A61B 17/1285 606/142 |
| 2007/0027458 A1 * | 2/2007 | Sixto, Jr. | A61B 17/122 606/142 |
| 2007/0135802 A1 * | 6/2007 | Suzuki | A61B 17/0218 606/1 |
| 2008/0027467 A1 | 1/2008 | Satake et al. | |
| 2008/0140089 A1 * | 6/2008 | Kogiso | A61B 17/1285 606/142 |
| 2008/0208217 A1 * | 8/2008 | Adams | A61B 17/122 606/143 |
| 2009/0105533 A1 * | 4/2009 | Fujita | A61B 17/1227 600/104 |
| 2011/0054521 A1 * | 3/2011 | Ventura | A61B 17/0057 606/216 |
| 2011/0238093 A1 * | 9/2011 | Matsuoka | A61B 17/1285 606/151 |
| 2011/0245855 A1 * | 10/2011 | Matsuoka | A61B 17/122 606/157 |
| 2012/0089176 A1 * | 4/2012 | Sigmon, Jr. | A61B 17/10 606/205 |
| 2013/0072947 A1 * | 3/2013 | Terada | B21D 53/36 72/332 |
| 2014/0379018 A1 * | 12/2014 | Martinez | A61B 17/08 606/206 |
| 2015/0230799 A1 * | 8/2015 | Satake | A61B 17/122 606/142 |
| 2015/0374381 A1 * | 12/2015 | Satake | A61B 17/122 606/142 |
| 2016/0302811 A1 * | 10/2016 | Rodriguez-Navarro | A61B 34/73 |
| 2018/0078262 A1 * | 3/2018 | Lehtinen | A61B 17/10 |
| 2018/0085122 A1 * | 3/2018 | Ryan | A61B 17/1227 |
| 2018/0098771 A1 * | 4/2018 | King | A61B 17/1227 |
| 2018/0153552 A1 * | 6/2018 | King | A61B 17/128 |

FOREIGN PATENT DOCUMENTS

| | | | |
|---|---|---|---|
| JP | 2009-072611 A | 4/2009 | |
| JP | 5750620 B2 | 7/2015 | |
| WO | WO-9600033 A1 * | 1/1996 | A61B 18/1492 |
| WO | 2006/076263 A2 | 7/2006 | |

* cited by examiner

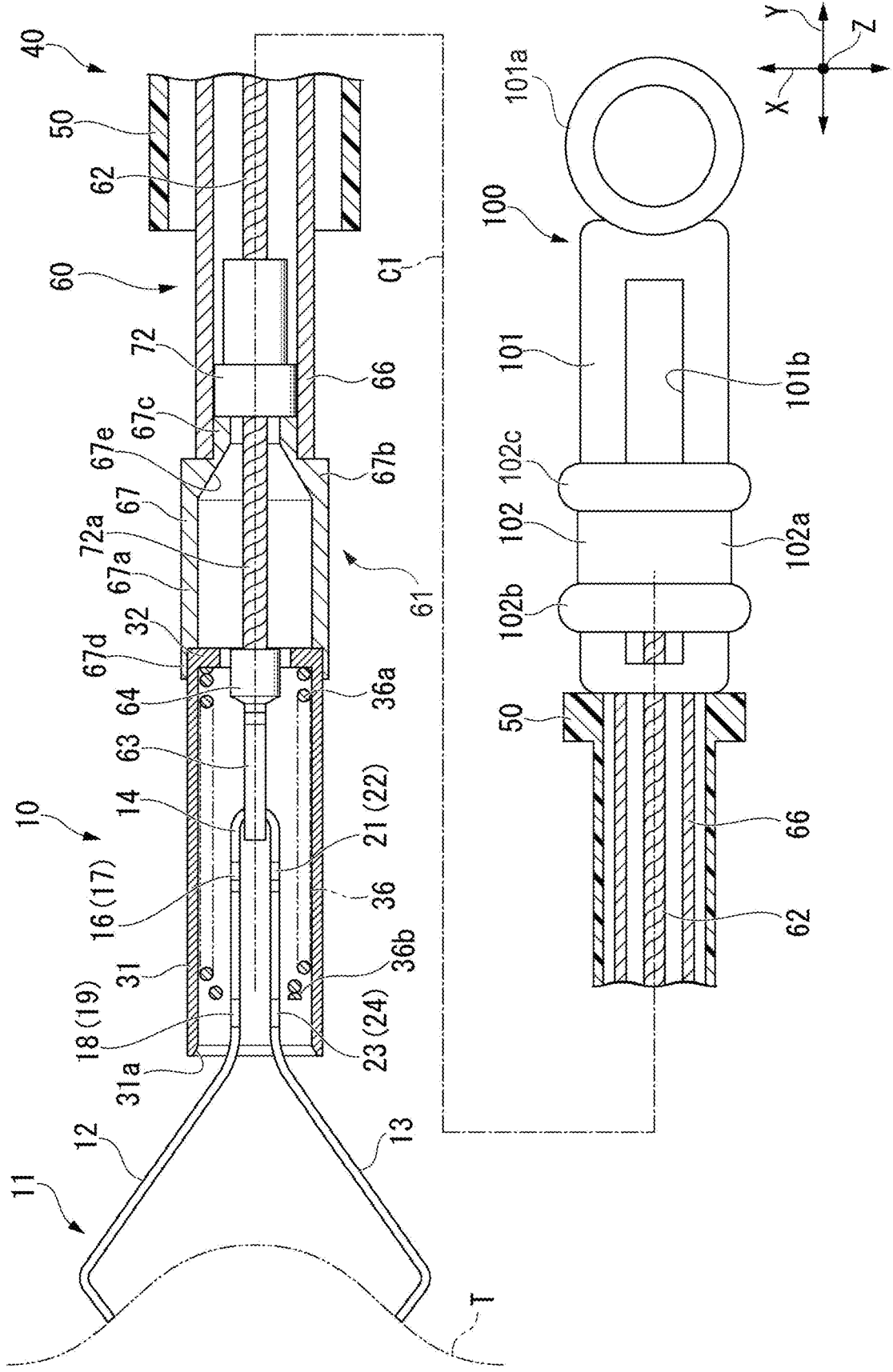

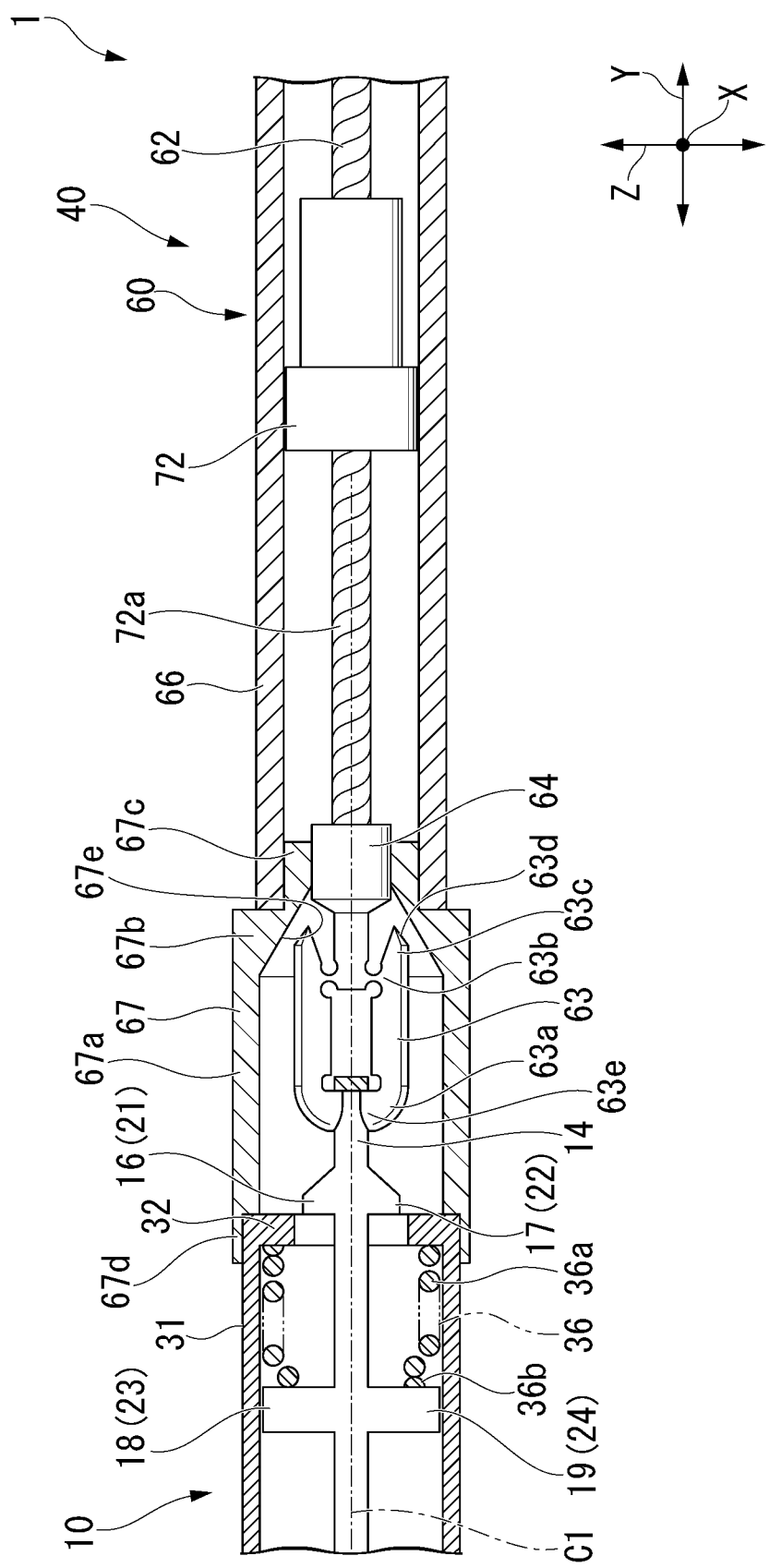

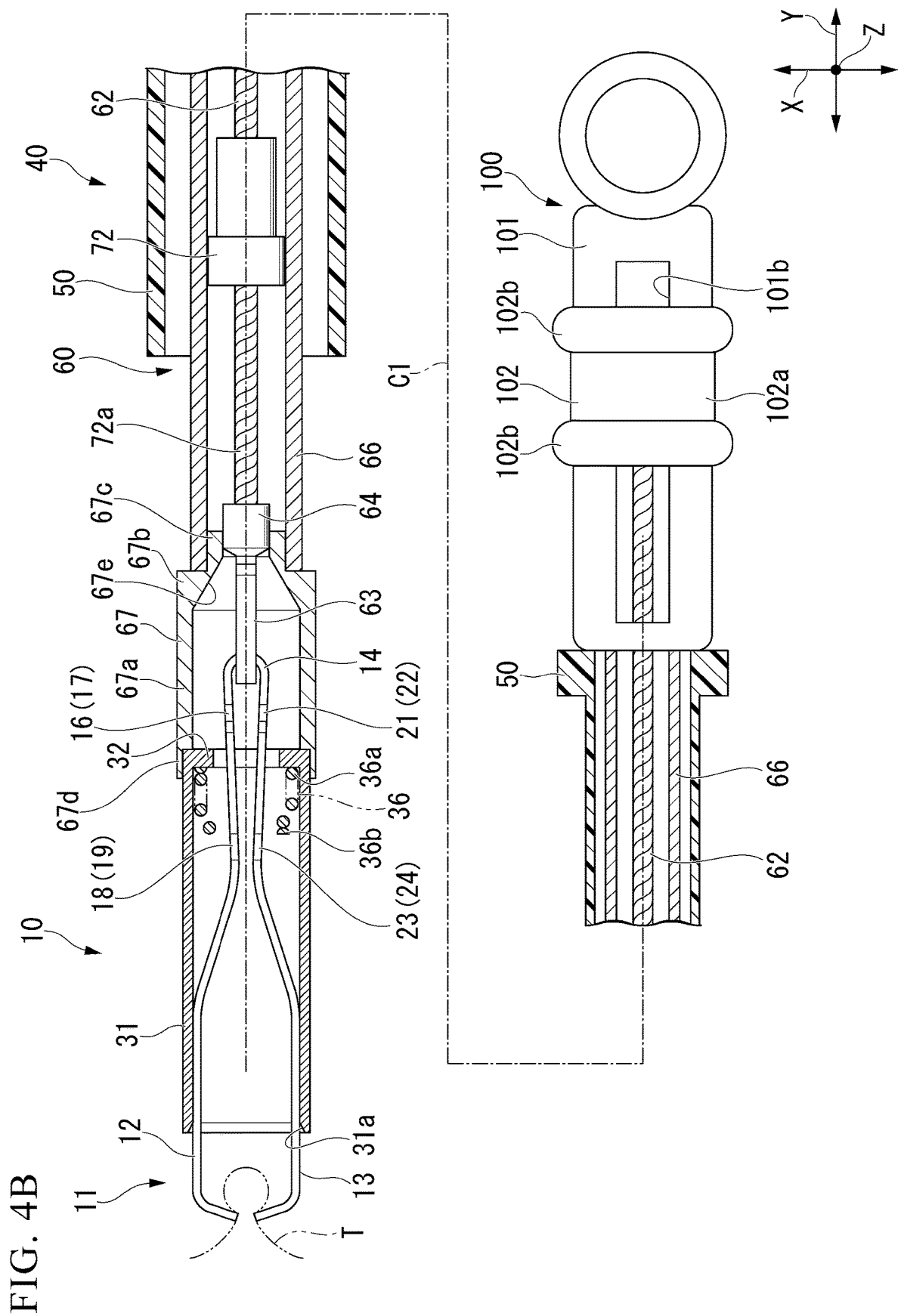

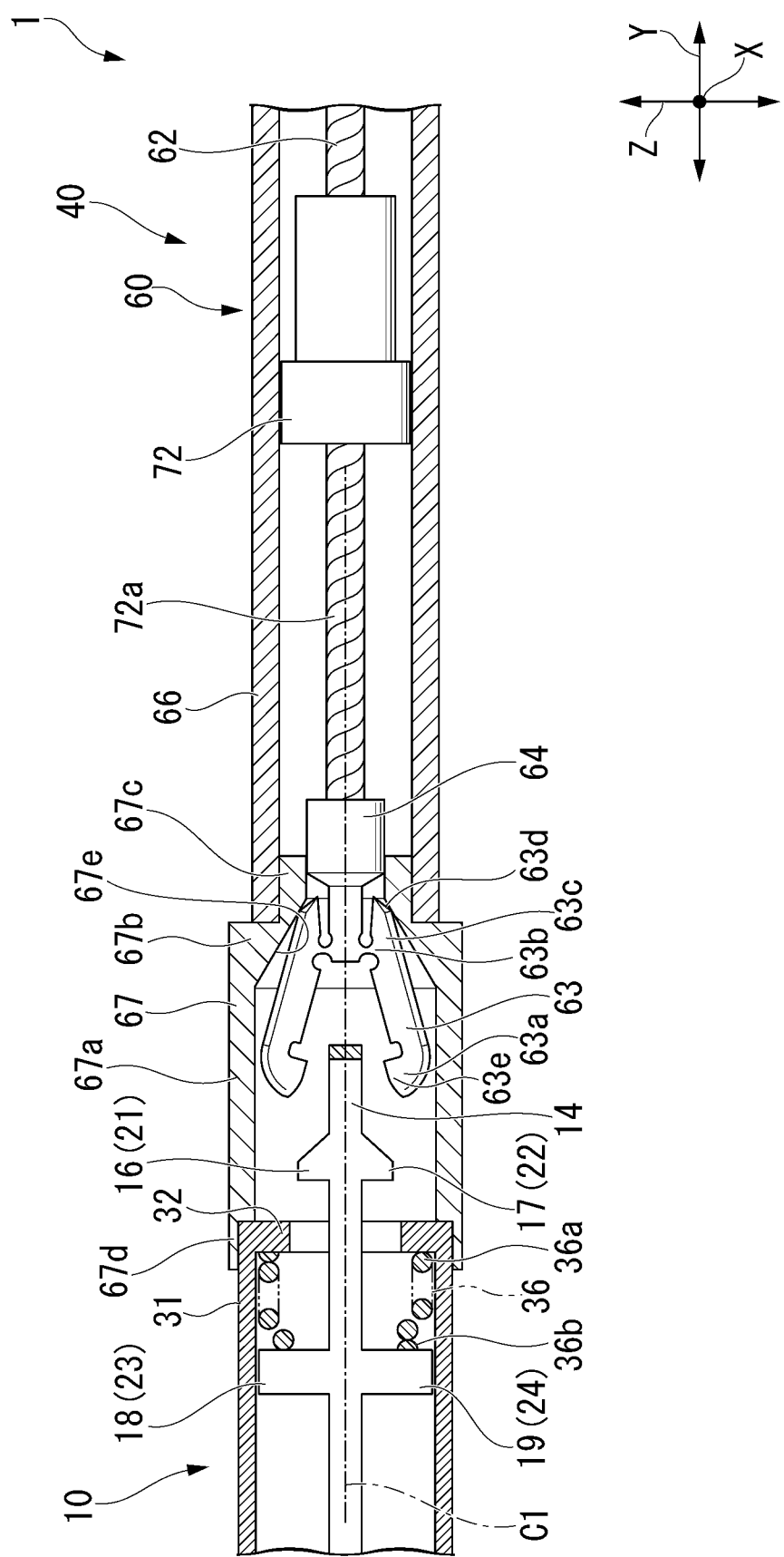

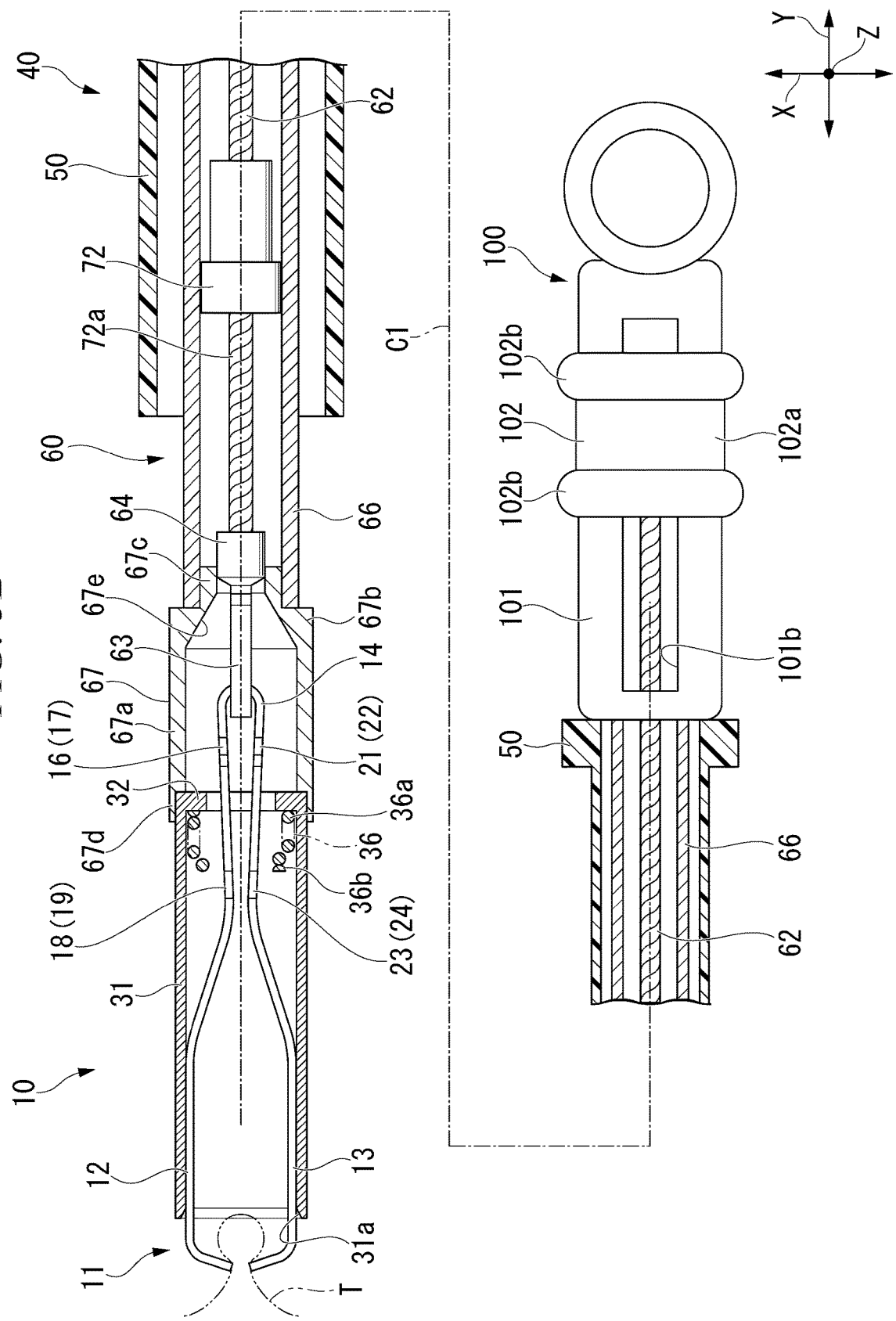

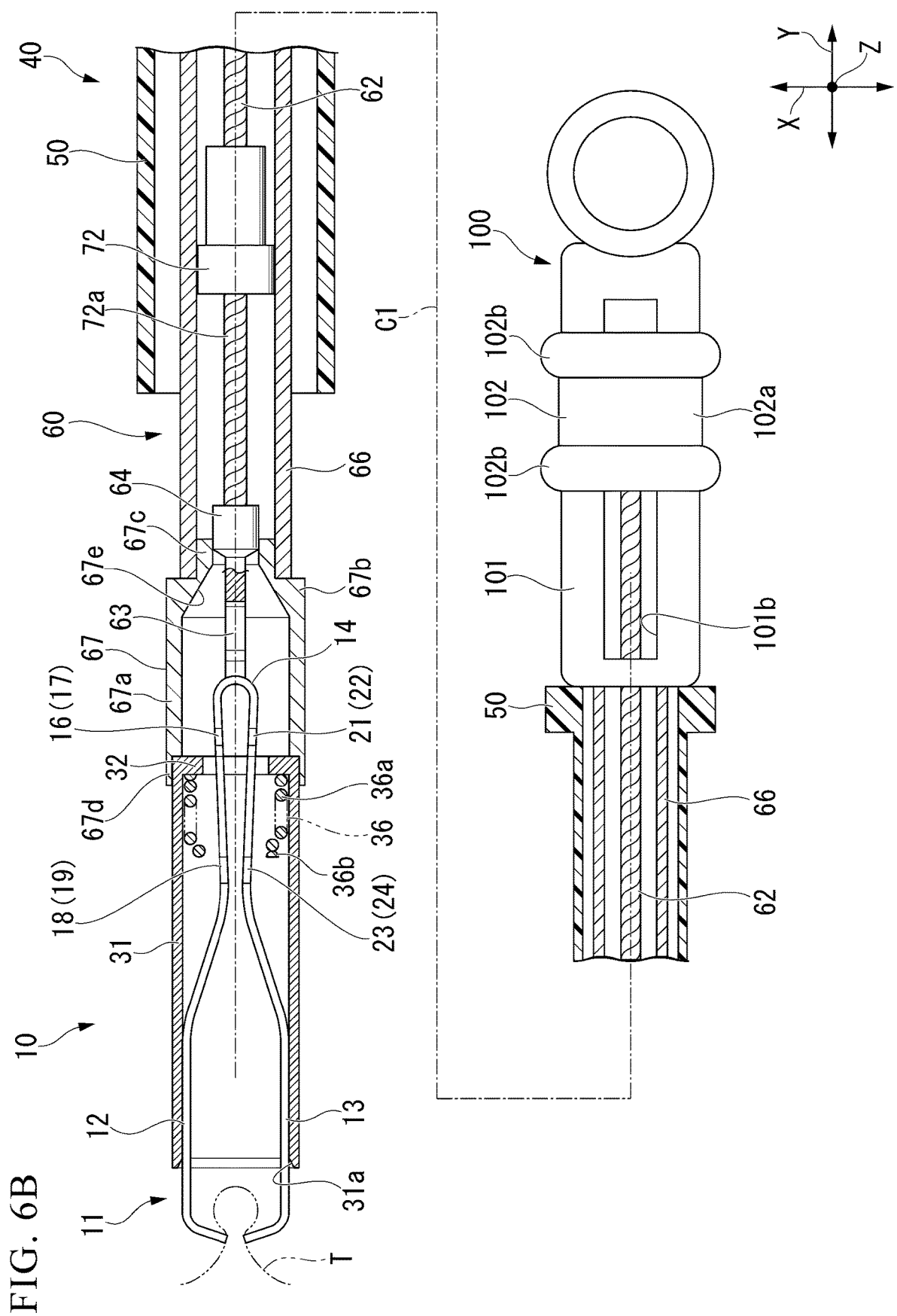

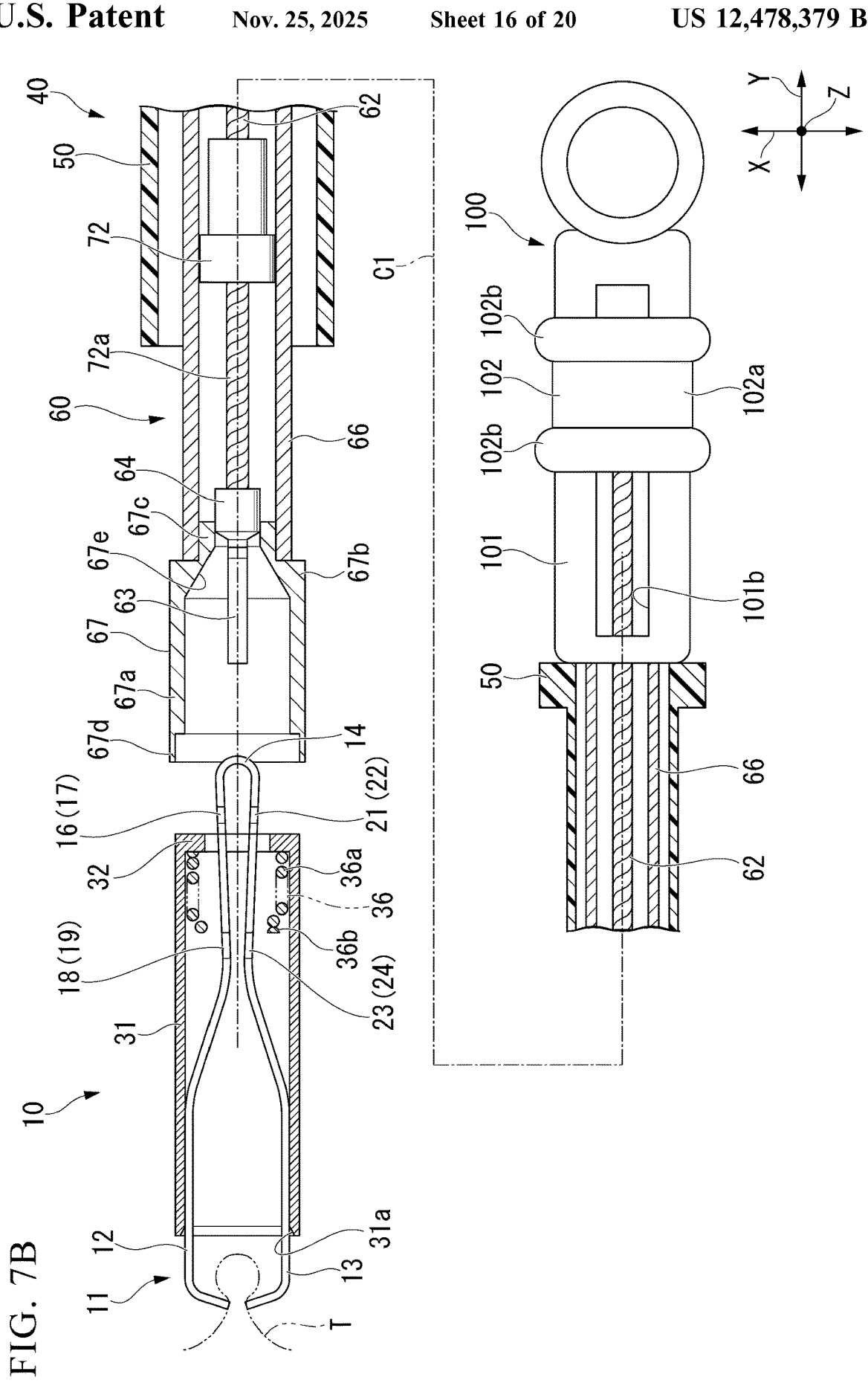

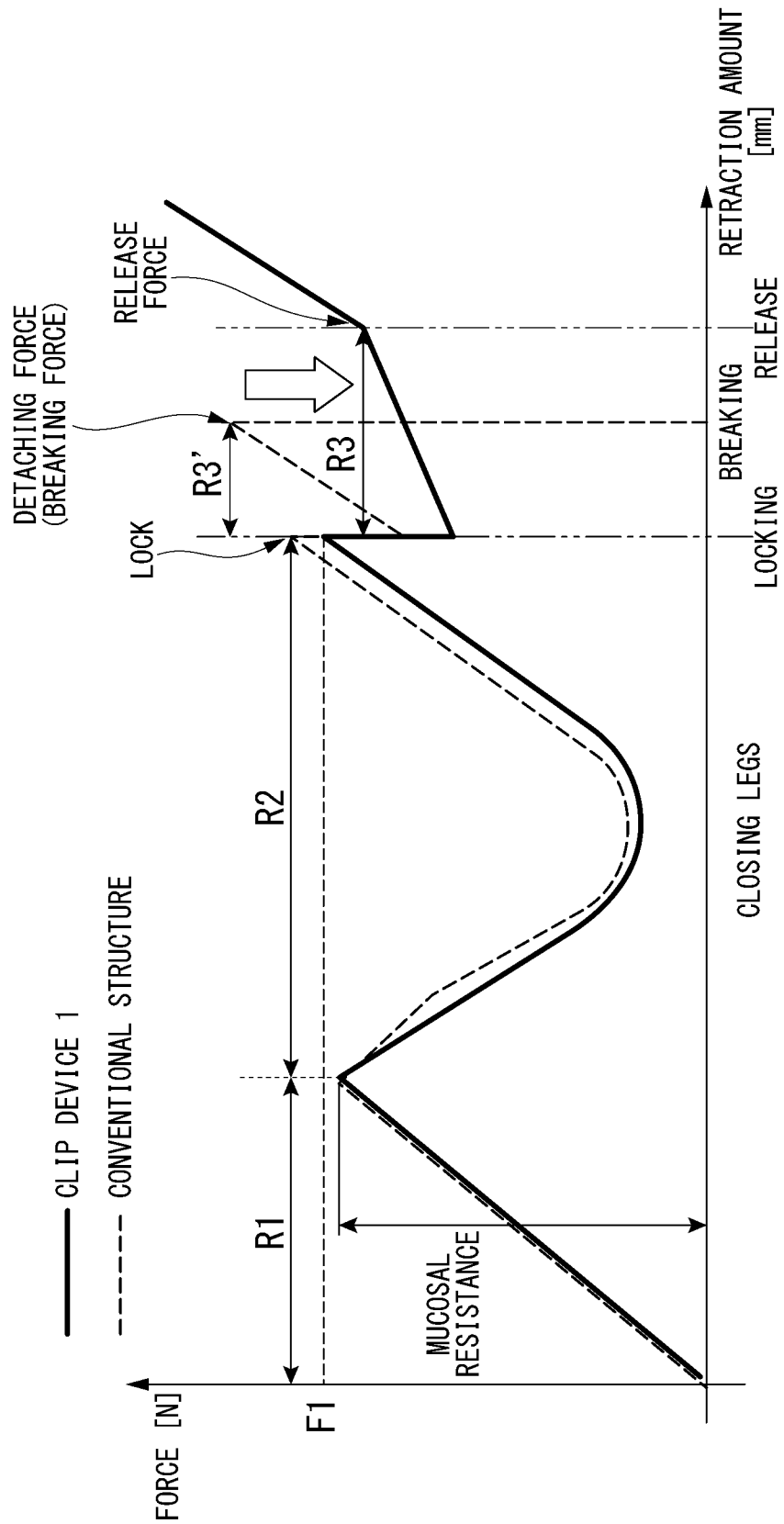

MEDICAL DEVICE AND METHOD OF RELEASING CLIP UNIT

CROSS-REFERENCE TO RELATED APPLICATIONS

This application is a continuation application of PCT International Application No. PCT/JP2018/045421, filed on Dec. 11, 2018. The content of the PCT International Application is incorporated herein by reference.

TECHNICAL FIELD

The present disclosure relates to a medical device configured to perform treatment to a target tissue in the body, particularly a ligation device or a clip device. The present disclosure also relates to a method of releasing (indwelling) a clip unit.

BACKGROUND

Conventionally known is a medical device which is introduced into the body of a patient via a channel of an endoscope for a usage of ligating the openings and blood vessels formed in the tissue.

The endoscope treatment tool includes a clip unit and a treatment tool body including an operation wire and a breaking mechanism.

When an operator retracts a slider toward the proximal end side, and the force applied to the breaking mechanism exceeds a predetermined tensile strength, the breaking mechanism is broken. As a result, the target tissue can be grasped by the clip unit and at the same time the clip unit can be indwelled in the body.

SUMMARY

According to an aspect of the present disclosure, a medical device includes a clip unit; an operation wire for operating the clip unit; a link capable of linking the clip unit and the operation wire; and a sheath having an inner diameter such that at least part of the link is insertable into the sheath. The link is disposed at a first position when the clip unit is in the open configuration, and at a second position when the clip unit is in the closed configuration. The link can be moved in contact with an inner circumferential surface of the sheath to release an engagement between the operation wire and the clip unit.

According to another aspect of the present disclosure, a method of releasing a clip unit from a medical device is disclosed. The method includes moving a link that is in a state of connecting the clip unit and an operation wire so as to cause at least part of the link to come in contact with an inner circumferential surface of a sheath into which at least part of the link is inserted. The connection between the clip unit and the operation wire is released the link coming into contact with the inner circumferential surface of the sheath.

BRIEF DESCRIPTION OF DRAWINGS

FIG. 1B is a cross-sectional planar view schematically showing the medical device according to the present embodiment.

FIG. 3A is a cross-sectional side view schematically showing the distal end portion of the medical device according to the present embodiment.

FIG. 4B is a cross-sectional planar view schematically showing the medical device according to the present embodiment.

FIG. 5A a cross-sectional side view schematically showing the distal end portion of the medical device according to the present embodiment.

FIG. 5B is a cross-sectional planar view schematically showing the medical device according to the present embodiment.

FIG. 6B is a cross-sectional planar view schematically showing the medical device according to the present embodiment.

FIG. 7B is a cross-sectional planar view schematically showing the medical device according to the present embodiment.

FIG. 9 is a graph comparing a result of the medical device according to the present disclosure and a result of a conventional endoscope treatment tool.

DESCRIPTION OF EMBODIMENT

Hereinafter, a configuration of a medical device (ligation device, clip device) according to an embodiment of the present disclosure will be described with reference from FIGS. 1A to 7B.

The medical device 1 according to the present embodiment is used by being inserted into a patient's body through a channel formed in an endoscope (not shown). In this specification, a side on which an endoscope operation section for the operator to operate the endoscope is located is defined as a proximal end side, and a side on which a distal end section of the endoscope inserted into the body is located is defined as a distal end side.

Figure 1A:
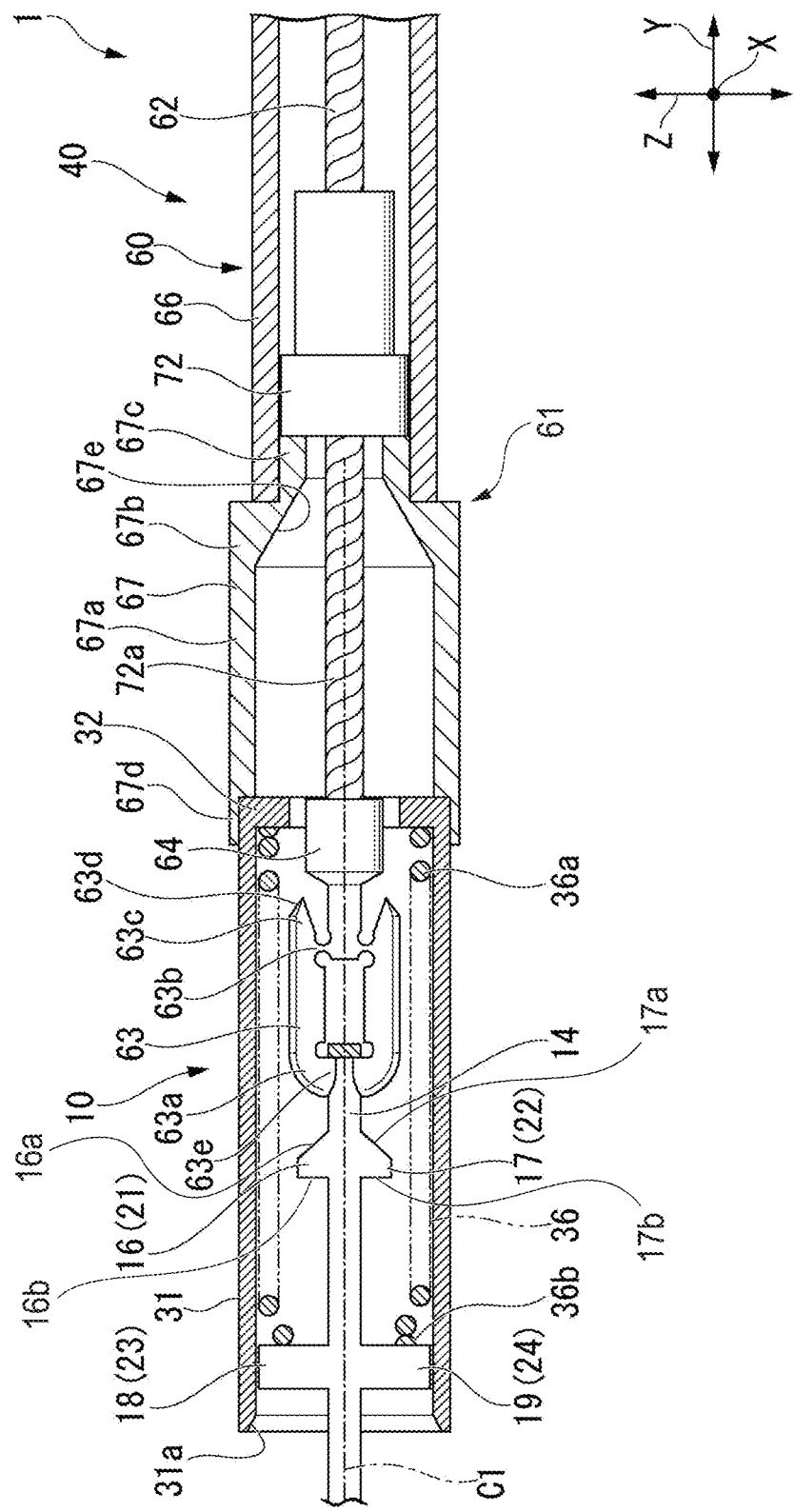
FIG. 1A is a cross-sectional side view schematically showing a distal end portion of a medical device according to an embodiment of the present disclosure.

As shown in FIG. 1A and FIG. 1B, the medical device 1 includes a clip unit (hereinafter, abbreviated as "clip") 10 and a treatment tool main body (applicator) 40. The clip 10 is attachably and detachably connected to the distal end portion of the treatment tool main body 40; however, the configuration of the clip 10 is not limited thereto. For example, the clip 10 according to the present embodiment may be connected to the treatment tool main body 40 in advance and configured to be detachable from the distal end portion of the treatment tool main body.

FIG. 1A and FIG. 1B are cross-sectional views along a plane passing through an axis (central axis) C1 of the clip 10. As shown in FIG. 1A, an opposite direction X in which a pair of arms of an arm member 11 of the clip 10 described below face each other, an axial direction Y parallel to the axis C1 of the clip 10, and an orthogonal direction Z that is orthogonal to each of the opposite direction X and the axial direction Y are defined.

(Configuration of Clip 10)

As shown in FIGS. 1A and 1B, the clip 10 is configured to include the arm member 11, a pressing tube 31, and an elastic member (a spiral spring) 36.

The pressing tube 31 is formed in a tubular shape (preferably in a cylindrical shape) and has an inner diameter into which a proximal end portion of the arm member 11 is capable of entering. That is, a lumen into which the arm member 11 having a first arm 12 and a second arm 13 described below may enter is formed in the pressing tube 31. The elastic member 36 is arranged in the lumen of the pressing tube 31.

The arm member 11 has the first arm 12, the second arm 13, and a central portion 14. The first arm 12 and the second arm 13 are configured to extend from the proximal end side toward the distal end side and are arranged to face each other. The central portion 14 is located between the proximal end portion of the first arm 12 and the proximal end portion of the second arm 13. As shown in FIG. 1B, the first arm 12 and the second arm 13 may be formed at positions to be line-symmetrical with respect to the axis C1.

In the natural state, the first arm 12 and the second arm 13 are separated from each other, and the distance between the first arm 12 and the second arm 13 increases along a direction from the proximal end side toward the distal end side. In the present specification, the "natural state" refers to a state in which an external force is not applied to the arm member 11. For example, a state in which a force by an inner wall of the pressing tube 31 does not apply to the first arm 12 and the second arm 13 of the arm member 11 is the natural state. A claw extending toward the second arm 13 side is formed at the distal end portion of the first arm 12. A claw extending toward the first arm 12 side is formed at a distal end portion of the second arm 13.

The first arm 12 and the second arm 13 are formed to have a rounded shape that a cross-sectional shape orthogonal to a longitudinal direction at the distal end side is an arc shape. More specifically, each of central portions of the outer surfaces of the first arm 12 and the second arm 13 in the orthogonal direction Z that will be described below, is formed into a curved surface to form a convex portion that is convex outwardly toward the external side.

The first arm 12 and the second arm 13 are configured in such a manner so as to have improved strength against bending and reduce frictional resistance to the outer sheath 50 described below so as to smoothly advance and retract.

As shown in FIG. 1A, two first locked portions 16, 17 are provided at the proximal end portion of the first arm 12. The first locked portions 16, 17 are provided on a reference plane extending in the Y and Z directions and parallel to the axis line (central axis line) C1 of the pressing tube 31. The first locked portions 16, 17 protrude from a lateral surface of the first arm 12 in the orthogonal direction Z. As shown in FIG. 1A and FIG. 1B, the first locked portions 16, 17 may protrude in directions opposite to each other and may be formed at positions to be line symmetrical with respect to the axis C1.

As shown in FIG. 1A, a proximal end surface 16a of the first locked portion 16 is inclined to be separated from the first arm 12 (center axis C1) toward the distal end side. A distal end surface 16b of the first locked portion 16 is orthogonal to the axial direction Y. A proximal end surface 17a of the first locked portion 17 and the proximal end surface 16a of the first locked portion 16 are line-symmetric with respect to the axis C1. The distal end surface 17b of the first locked portion 17 and the distal end surface 16b of the first locked portion 16 may be line-symmetric with respect to the axis C1.

As shown in FIGS. 1A and 1B, two protrusions 18, 19 are provided at a more distal end side of the first locked portions 16, 17 of the first arm 12 respectively. As shown in FIG. 1A, the protrusions 18 and 19 protrude from a side surface of the first arm 12 in the orthogonal direction Z. The protrusion 18 and the protrusion 19 may be line-symmetric with respect to the axis C1 in a side view. The lengths of the protrusions 18, 19 protruding from the first arm 12 may be longer than the length of the first locked portions 16, 17 protruding from the first arm 12 in the orthogonal direction Z, respectively.

As shown in FIG. 1B, second locked portions 21, 22 and second protrusions 23, 24 which are formed in the same manner as the first locked portions 16, 17 and the protrusions 18, 19 of the first arm 12 are provided in the second arm 13 (the second locked portion 22 and the second protrusion 24 are not shown). In other words, the second locked portions 21, 22 of the second arm 13 protrude from the side surface of the second arm 13 in the orthogonal direction Z which is a direction in which the second arm 13 is separated from the first arm 12. The protrusions 23, 24 of the second arm 13 protrude in the orthogonal direction Z from the side surface of the second arm 13 at a more distal end side of the second locked portions 21, 22 of the second arm 13. The second locked portions 21, 22 and the protrusions 23, 24 are arranged in the opposition direction X with respect to the first locked portions 16, 17 and the protrusions 18, 19 respectively. As shown in FIG. 1A, the second locked portions 21, 22 overlap the first locked portions 16, 17, and the protrusions 23, 24 overlap the protrusions 18, 19, respectively.

These members including the arm member 11 that configure the clip 10 are made of a material such as a cobalt chrome alloy, titanium, or stainless steel. The clip 10 may also be configured to be observable under MRI (Nuclear Magnetic Resonance Imaging) fluoroscopy.

For example, the arm member 11 is formed by punching a plate material formed of a cobalt chrome alloy into a shape as expanding the first arm 12, the second arm 13, the central portion 14, the first locked portions 16, 17, the second locked portion 21, 22 and the protrusions 18, 19, 23, 24 into a flat shape. The arm member 11 is integrally formed by being bent at a connecting portion between the first arm 12 and the central portion 14, and a connecting portion between the second arm 13 and the central portion 14 to form a C-shape in a planar view.

The first arm 12 and the second arm 13 of the arm member 11 have an elastic restoring force such that each distal end moves in a direction separating from each other, in other words, a direction in which the arm member 11 opens.

As shown in FIGS. 1A and 1B, a locking portion 32 is formed on an inner wall of the proximal end portion of the pressing tube 31 so as to protrude over the whole circumference of the inner wall. A portion of the first arm 12 at the proximal end side than the protrusions 18, 19, a portion of the second arm 13 at the proximal end side than the protrusions 23, 24, and the central portion 14 are capable of being inserted into the locking portion 32.

According to the present embodiment, the first locked portions 16, 17 and the second locked portions 21, 22 of the arm member 11 together with the locking portion 32 of the pressing tube 31 are a locking mechanism configured to restrict the transition of the clip 10 from a closed configuration to an open configuration as described below.

As shown in FIG. 1A and FIG. 1B, a tapered surface 31a is formed on the inner wall of a distal end portion of the pressing tube 31 over the whole circumference. The tapered surface 31a has a diameter that increases toward the distal end side.

The arm member 11 of the clip 10 according to the present embodiment has the elastic restoring force such that distal ends of the first arm 12 and the second arm 13 move in a direction separating from each other. Accordingly, although it is not shown in figures, when the outer tube 50 moves toward the proximal end side and the state in which the first arm 12 and the second arm 13 are in contact with the inner wall of the outer tube 50 is released, the first arm 12 and the second arm 13 come in contact with the tapered surface 31a formed in the inner wall in the distal end portion of the pressing tube 31 and the opening width increases such that the first arm 12 and the second arm 13 enter the opening state. As a result, due to the elastic restoring force of the first arm 12 and the second arm 13, the arm member 11 is biased toward the direction of protruding from the pressing tube 31. In other words, the elastic restoring force of the first arm 12 and the second arm 13 functions to move the arm member 11 toward the distal end side.

The pressing tube 31 and the locking portion 32 may be integrally formed of a material such as 64 titanium alloy (Ti-6AL-4V) or cobalt chrome alloy.

As shown in FIG. 3A, an end coil portion 36b is provided at the distal end portion of the elastic member 36. The end coil portion 36b is formed to have an inner diameter smaller than that of other portions of the elastic member 36.

The elastic member 36 is accommodated in the pressing tube 31 and has a distal end portion locked by the protrusions 18, 19, 23, 24 and a proximal end portion locked by the locking portion 32. The proximal end portion of the elastic member 36 and the locking portion 32 may be fixed by welding or the like.

In the elastic member 36, a portion in the first arm 12 that is closer to the proximal end than the protrusions 18 and 19, a portion of the second arm 13 that is closer to the proximal end than the protrusions 23 and 24, and the central portion 14 are capable of being inserted thereinto. When the protrusions 18, 19, 23, 24 move to the proximal end side, the protrusions 18, 19, 23, 24 are locked by the end coil portion 36b of the elastic member 36. On the other hand, when the protrusions 18, 19, 23, 24 move to the proximal end side, the elastic member 36 is compressed by the protrusions 18, 19, 23, 24 in the axial direction Y. When the elastic member 36 is compressed, an elastic force that pushes the arm member 11 out of the pressing tube 31 in the axial direction Y is generated.

Even when the end coil portion 36b is not included in the elastic member 36, the same effect may be achieved by attaching another member such as a washer or the like to the distal end of the elastic member 36.

(Configuration of Treatment Tool Main Body 40)

Next, a configuration of the treatment tool main body according to the present embodiment will be described.

As shown in FIGS. 1A and 1B, the treatment tool main body 40 includes an outer sheath 50, an insertion portion 60, and an operation portion 100. The insertion portion 60 in advanceable and retractable in the outer sheath 50. The operation portion 100 is attached to a proximal end portion of the insertion portion 60.

The outer sheath 50 may be formed of, for example, a fluororesin such as PTFE (polytetrafluoroethylene) or a resin material such as HDPE (high density polyethylene).

The insertion portion 60 of the treatment tool main body 40 includes a sheath portion (sheath) 61, a power transmission member (operation wire, wire) 62, a link member 63, and a guide member 64. The power transmission member 62 is inserted into the sheath 61 so as to be advanceable and retractable in the sheath 61. The link member 63 is connected to a distal end portion of the power transmission member 62.

The sheath 61 has a coil sheath 66 and a distal member 67 fixed to a distal end portion of the coil sheath 66. The coil sheath 66 may be formed of stainless steel such as SUS301 having high compressive strength. The coil sheath 66 may be configured by using a coil formed by closely winding a wire (not shown) in the axial direction Y. The coil sheath 66 has flexibility while being strong against a compressive force in the axial direction Y. The inner diameter of the coil sheath 66 may be substantially the same with the inner diameter of the elastic member 36.

The distal member 67 may be formed in a tubular shape (preferable in a cylindrical shape) and made of, for example, stainless steel or the like. The distal member 67 is configured by a distal end portion 67a, an inclined-surface portion 67b, a proximal end portion 67c, and a support portion 67d. According to the present embodiment, an outer diameter of the distal end portion 67a may be larger than the outer diameter of the pressing tube 31. An outer diameter of the proximal end portion 67c may be smaller than an inner diameter of the coli sheath 66. The inclined-surface portion 67b is configured to connect the distal end portion 67a and the proximal end portion 67c, and the inclined-surface portion 67b is formed with an inner diameter decreasing from the distal end side toward the proximal end side. In other words, in the inclined-surface portion 67b, an inner circumferential surface (inclined surface) 67e is formed to be inclined from the distal end side toward the proximal end side and in a tapered shape such that the distance to the axis C1 decreases. In other words, the lumen formed inside the inclined-surface portion 67b has an inner diameter gradually decreases from the distal end side toward the proximal end side.

According to the present embodiment, the lumen formed inside the distal end portion 67a of the distal member 67 has the inner diameter such that at least part of the link member 63 can be inserted into the lumen. As description below, the state in which a pair of legs 63a of the link member 63 is closed may be released by the inclined-surface portion 67b of the distal member 67 where the inner circumferential surface 67e in a tapered shape is formed coming into contact with a pair of tails 63c of the link member 63. In other words, the inclined-surface portion 67b of the distal member 67 is a release mechanism configured to cancel (release) the engagement between the link member 63 and the clip 10.

According to the present embodiment, the proximal end portion 67c is formed to be positioned at the proximal end side than the inclined-surface portion 67b of the distal member 67. The inner diameter of the lumen formed inside the proximal end portion 67c may be equal to the inner diameter at the proximal end of the lumen formed in the inclined-surface portion 67b, in other words, the minimum inner diameter of the lumen formed in the inclined-surface portion 67b. According to the present embodiment, the distal member 67 and the coil sheath 66 are fixed to each other by laser brazing or the like in a state in which the distal end of the coil sheath 66 is engaged with the outer circumferential surface of the proximal end portion 67c of the distal member 67.

The inner diameter of the distal end portion 67a of the distal member 67 may be set to a value such that when the clip 10 is in the locking state described below, the distal member 67 and the first locked portions 16, 17, the second locked portions 21, 22 do not engage with each other. As described below, the inner diameter of the distal member 67 may be set to a value such that when the pair of legs of the link member 63 is in the open state, the outer circumferential surface of each of the pair of legs 63a is not in contact with the inner circumferential surface of the distal member 67.

A step difference is formed on the whole circumference on the inner circumferential surface of the distal end portion of the distal member 67. In the step difference, a surface facing the distal end side is a distal end support surface (distal end surface). A support portion 67d is formed at a more distal end side than the distal end support surface. According to the present embodiment, an inner diameter of the support portion 67d is slightly larger than the outer diameter of the pressing tube 31. Accordingly, the inner diameter of the support portion 67d is capable of accommodating (receiving) the proximal end of the pressing tube 31. The distal end support surface of the distal member 67 is contactable with the proximal end surface of the pressing tube 31. The support portion 67d is able to support the outer circumferential surface of the pressing tube 31 being in contact with the distal end support surface.

According to such configuration, the unstableness of the clip 10 with respect to the support portion 67d can be suppressed as small as possible. Even a certain degree of inclination of the clip 10 with respect to the support portion 67d occurs, the clip 10 is in contact with the support portion 67d such that the clip 10 is supported by the support portion 67d so as to not to be further inclined. In other word, the clip 10 may be slightly inclined with respect to the support portion 67d. Accordingly, the medical device 1 can be smoothly inserted even in a bent shape of an endoscope channel or the like.

According to the present embodiment, for example, the power transmission member 62 may be formed of a metal single wire or a twisted wire. However, the configuration of the power transmission member 62 is not limited thereto. For example, the power transmission member 62 may be formed in a rod shape having rigidity. A distal end of the power transmission member 62 is connected to the proximal end of an enlarge dimeter portion 72. A connection member 72a is connected to the distal end portion of the enlarge diameter portion 72.

The enlarge diameter portion 72 is formed of metal or the like and formed in a cylindrical shape. The outer diameter of the enlarge diameter portion 72 is smaller than the inner diameter of the coil sheath 66 and larger than the inner diameter of the proximal end portion 67c of the distal member 67.

According to the present embodiment, the connection member 72a is configured to connect the enlarge diameter portion 72 and the link member 63. The connection member 72a may have the same configuration as that of the power transmission member 62, for example. For example, in a case of forming the connection member 72a by a single wire, the distal end and the proximal end thereof may be fixed to the proximal end of the link member 63 and the distal end of the enlarge diameter portion 72 respectively by brazing, resistance welding or the like.

As shown in FIG. 1A and FIG. 1B, the link member 63 is formed of the pair of legs 63a at the distal end side that are capable of being opened, a pair of deformation portions (fulcrum portions) 63b formed to extend in a direction intersecting with the axis C1, and a pair of tails 63c where inclined surface is formed at the proximal end side thereof. According to the present embodiment, the link member 63 is formed of metal material, for example, the link member 63 may be integrally formed of stainless steel.

The pair of legs 63a of the link member 63 is formed to extend toward the distal end side from the deformation portion 63b, in other words, toward the clip 10 side. When the link member 63 is in the natural state in which there is no external force applied to the link member 63, the distal ends of the pair of legs 63a are in contact with each other or in an approaching state. The portions of the pair of legs 63a at the proximal end side are separated from each other such that an internal space is formed therein. In this state, the central portion 14 of the arm member 11 is positioned in the internal space of the pair of legs 63a and a folded-back portion 63e formed at the distal end side of the pair of legs 63a is engaged with the central portion 14 of the arm member 11. Accordingly, as shown in FIG. 1A and FIG. 1B, it is possible to connect the clip 10 and the link member 63 of the insertion portion 60.

The deformation portion 63b is formed between the leg 63a and the tail 63c in the link member 63. According to the present embodiment, for example, the deformation portion 63b may be formed to extend in a direction intersecting with the longitudinal axis of the power transmission member 62. In the link member 63, the deformation portion 63b is formed to have a rigidity lower than the leg 63a and the tail 63c. According to the present embodiment, for example, the deformation portion 63b may be formed with the thinnest width in the link member 63. As described below, by forming the deformation portion 63b in this manner, in a state in which the pair of tails 63c are engaged (in contact) with the inclined-surface portion 67b of the distal member 67, when a force pulling the link member 63 toward the proximal end side is applied, elastic deformation occurs in the deformation portion 63b of the link member 63. In other words, the link member 63 enters the open state in which each of the pair of legs 63a rotates outwardly with respect to the axis C1 with the deformation portion 63b as the fulcrum.

The pair of tails 63c are formed to protrude toward the proximal end side, that is, toward the power transmission member 62 side. The proximal end surfaces 63d of the pair of tails 63c are inclined to approach the axis C1 towards the proximal end side.

According to the present embodiment, the width of the link member 63 is the outer diameter of the link member 63 in the direction orthogonal to the axis C1 in the natural state.

The width of the link member 63 is smaller than the inner diameter of the elastic member 36, the inner diameter of the locking portion 32 of the pressing tube 31, and the inner diameter of the distal end portion 67a of the distal member 67. On the other hand, the width of the link member 63 may be larger than the inner diameter of the proximal end portion 67c of the distal member 67.

The guide member 64 is configured to connect the distal end portion of the power transmission member 62 and the proximal end portion of the link member 63. The guide member 64 is configured to have an outer diameter smaller than the inner dimeter of the locking portion 32 of the pressing tube 31 such that the guide member 64 may pass through the locking portion 32 of the pressing tube 31 without being caught by the locking portion 32. The guide member 64 is formed to have the outer diameter slightly smaller than the inner diameter of the proximal end portion 67c of the distal member 67 such that wobbling with respect to the inner circumferential surface of the proximal end portion 67c may be suppressed as small as possible when the guide member 64 passes through the proximal end portion 67c of the distal member 67. The guide member 64, for example, may be formed of metal material in a pipe shape. According to the present embodiment, the link member 63 and the guide member 64 may be connected by welding or the like to form an integrated configuration.

As shown in FIG. 1B, the operation portion 100 has an operation unit main body (handle) 101 and a slider 102.

The operation portion main body 101 is attached to the proximal end of the coil sheath 66. The operation portion main body 101 is formed in a rod shape extending in the axial direction Y, and a finger hook portion 101a is disposed at a proximal end portion of the operation portion main body. A slit 101b extending in the axial direction Y is formed in the operation unit main body 101.

The slider 102 is inserted into the operation portion main body 101. The slider 102 is slidable (advances and retracts) in the axial direction Y with respect to the operation unit main body 101. The proximal end of the power transmission member 62 is connected to the slider 102. In the clip 10 according to the present embodiment, the power transmission member 62 advances and retracts by advance operation and retraction operation of the slider 102 along the axial direction Y. The enlarge dimeter portion 72, the link member 63, and the arm member 11 of the clip 10 disposed at the distal end side of the power transmission member 62 are advanced or retracted. As a result, a pair of first arm 12 and second arm 13 of the arm member 11 may be opened or closed.

The slider 102 is formed in a cylindrical shape. On an outer circumferential surface of the slider 102, a recess 102a is formed over the whole circumference. On the slider 102, a flange portion 102b, a recess portion 102a, and a flange portion 102c are formed in this sequence from the distal end side to the proximal end side in the axial direction Y. The pair of flange portions 102b and 102c have an elliptical shape when viewed in the axial direction Y. As a result, the slider 102 is configured to be easy to be grasped and space-saving may be achieved at the time of packaging the operation portion 100 of the medical device 1. The slider 102 is configured to restrict the movement range of the slider 102 with respect to the operation main body 101 in the axial direction Y by engaging with the slit 101b of the operation portion main body 101.

Next, a medical procedure for ligating a target tissue T using the medical device 1 having the above-described configuration will be described. More specifically, the operations of using the medical device 1 according to the present embodiment to indwell the clip 10 in the body will be mainly described.

(Initial State of Medical Device 1)

According to the present embodiment, description in details will be omitted; however, for example, the operator may introduce the medical device 1 to the vicinity of the target tissue T through the channel of the endoscope inserted into the body and protrude the arm member 11 of the clip 10 from the distal end of the endoscope. The operator may make the target tissue T to be positioned between the first arm 12 and the second arm 13 of the arm member 11 by pushing the arm member 11 in the open state toward the target tissue T. According to the present embodiment, the state in which the target tissue T is positioned between the first arm 12 and the second arm 13 of the arm member 11 in the open state is referred to as the initial state of the medical device 1.

FIG. 1A and FIG. 1B are views showing the initial state in which the arm member 11 of the clip 10 of the medical device 1 according to the present embodiment are open at the maximum opening width. In the initial state, the enlarge diameter portion 72 connected to the distal end of the power transmission member 62 is in contact with the proximal end portion 67c of the distal member 67 such that the enlarge diameter portion 72 is impossible to further move toward the distal end side. At this time, the first arm 12 and the second arm 13 of the arm member 11 enter a state in which the first arm 12 and the second arm 13 almost protrude from the pressing tube 31. In this state, the first arm 12 and the second arm 13 are not restricted by the tapered surface 31a at the distal end side of the pressing tube 31 such that the arm member 11 enters the open configuration with the maximum opening width.

According to the present embodiment, the state in which the opening width of the arm member 11 is the maximum is described as an example of the open configuration; however, the open configuration is not limited thereto. In order to suitably perform treatment to the target tissue T, the state in which the opening width of the arm member 11 of the clip 10 is set corresponding to the size of the target tissue T is included in the open configuration according to the present embodiment.

In this state, the pair of legs 63a of the link member 63 is disposed inside the pressing tube 31 in a closed state. Accordingly, the central portion 14 at the proximal end side of the arm member 11 is clamped by the pair of the legs 63a of the link member 63 such that the arm member 11 and the link member 63 are connected with each other. According to the present embodiment, when the arm member 11 of the clip 10 is in the open configuration, a position where the pair of legs 63a of the link member 63 is positioned in a closed state is defined as a first position of the link member 63. According to the present embodiment, the state in which the arm member 11 and the link member 63 are connected (engaged) with each other is referred to as the engagement configuration in which the clip 10 and the power transmission member 62 are engaged with each other. As described below, the state in which the engagement of the arm member 11 and the link member 63 is released is referred to as the separation configuration in which the engagement of the clip 10 and the power transmission member 62 is released and the clip 10 and the power transmission member 62 are separated from each other.

When the link member 63 is at the first position, the link member 63 and the inclined-surface portion 67b of the distal member 67 are separated from each other at a certain distance. In the pressing tube 31, the elastic member 36 may be in a state in which the strands 36a adjacent to each other in the axial direction Y are separated from each other and are almost not compressed. In other words, the elastic member may be substantial at the equilibrium length. At this time, the first locked portions 16, 17 and the second locked portions 21, 22 of the arm member 11 are not in contact with the locking portion 32 of the pressing tube 31.

When the arm member 11 of the clip 10 is in the open configuration, the operator may grasp the target tissue T using the clip 10. Subsequently, when the operator pulls the slider 102 disposed at the proximal end side of the operation portion 100, as shown in FIG. 2A and FIG. 2B, it is possible to pull the arm member 11 in the state of grasping the target tissue T toward the proximal end side with respect to the pressing tube via the power transmission member 62.

(Contact State of Medical Device 1)

Figure 2A:
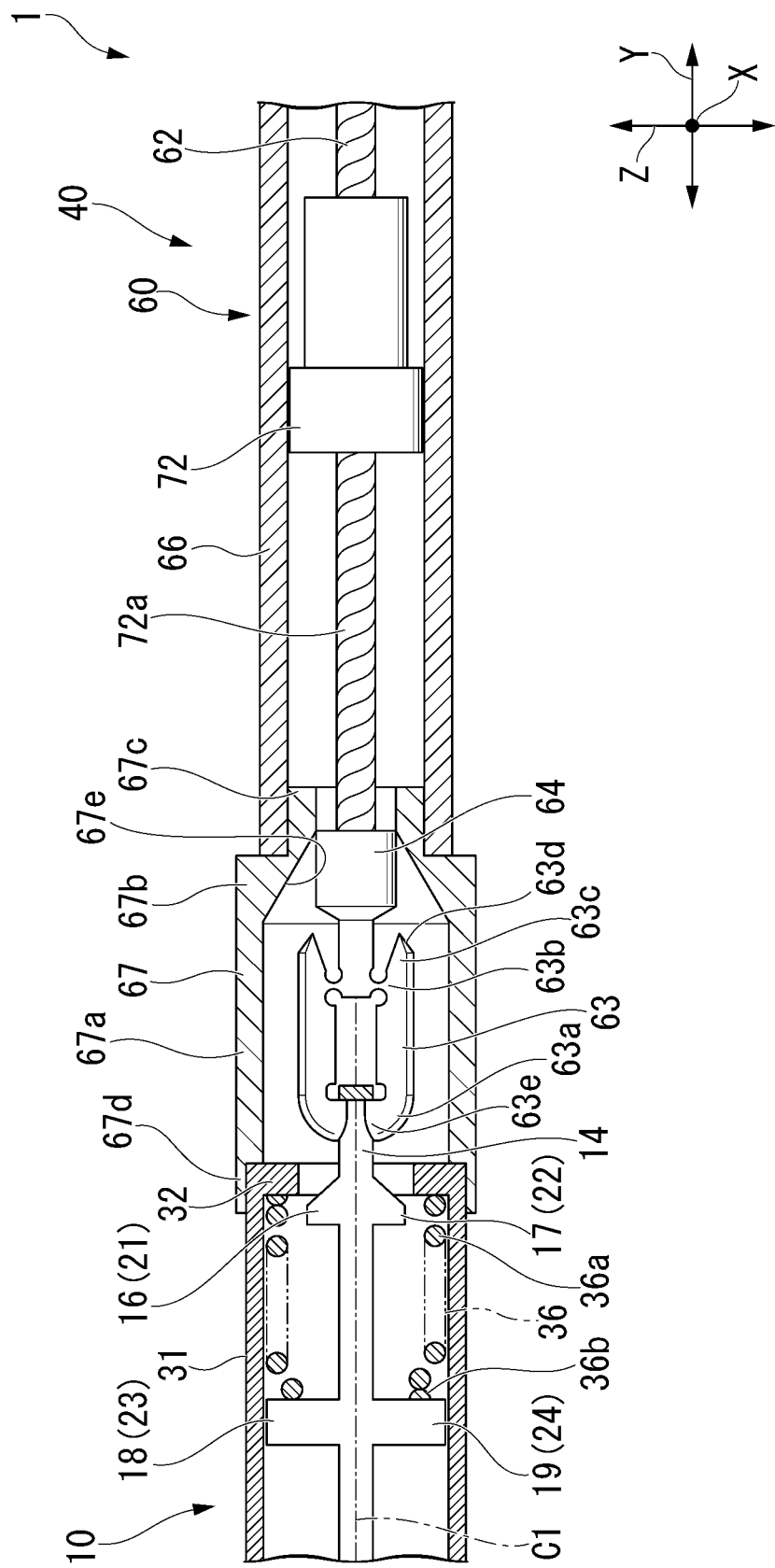
FIG. 2A a cross-sectional side view schematically showing the distal end portion of the medical device according to the present embodiment.
Figure 2B:
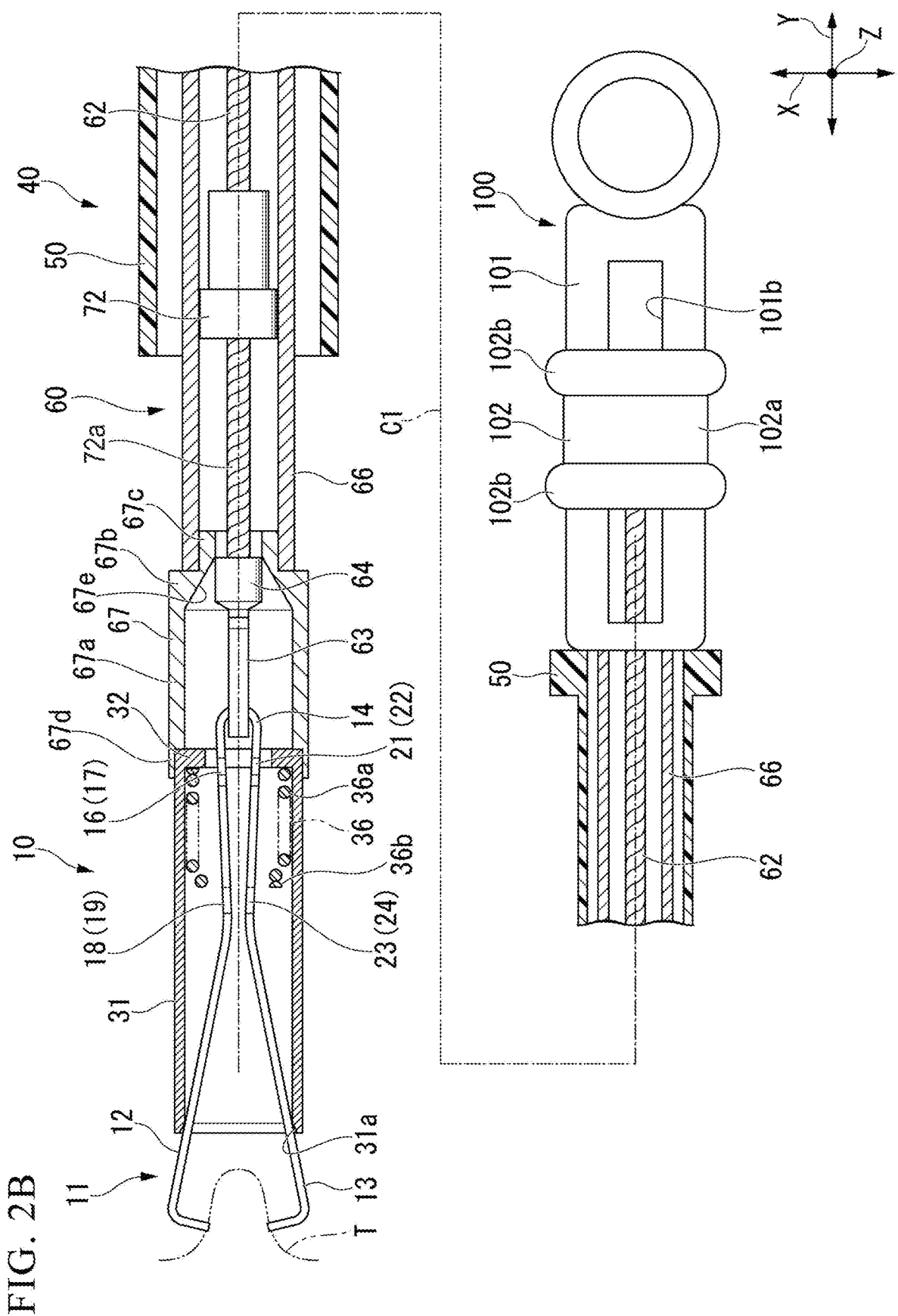
FIG. 2B is a cross-sectional planar view schematically showing the medical device according to the present embodiment.

FIG. 2A and FIG. 2B are views showing a state in which the first locked portions 16, 17 and the second locked portions 21, 22 of the arm member 11 come in contact with the locking portion 32 of the pressing tube 31 and to climb on and overcome the locking portion 32 in the operation of the operator to pull (retract) the slider 102 toward the proximal end side.

As shown in FIG. 2A, in this state, the link member 63 moves beyond the locking portion 32 of the pressing tube 31 into the distal member 67. The engagement between the pair of legs 63a of the link member 63 and the central portion 14 of the arm member 11 is maintained. That is, the engagement configuration in which the clip 10 and the power transmission member 62 are engaged with each other is maintained. At this time, the guide member 64 connected to the proximal end side of the link member 63 may be located inside the distal member 67, and may be in a state of entering the proximal end portion 67c from the distal end side.

As shown in FIG. 2B, in the arm member 11 engaged with the link member 63, the elastic member 36 is partially compressed by the protrusions 18, 19. The first arm 12 and the second arm 13 of the arm member 11 are in contact with the tapered surface 31a formed on the inner peripheral surface at the distal end side of the pressing tube 31. In this state, when the first arm 12 and the second arm 13 are pulled back toward the proximal end side while being in contact with the tapered surface 31a, the distance between the first arm 12 and the second arm 13 is decreased by the tapered surface 31a. In other words, the opening width of the arm member 11 is decreased, and the root of the target tissue T is more tightly bound. At this time, the first arm 12 and the second arm 13 of the arm member 11 may be in a state of being in contact with each other or a state in which the distance therebetween is substantially zero. According to the present embodiment, the state in which the first arm 12 and the second arm 13 of the arm member 11 are in contact with each other or the distance therebetween is substantially zero is defined as a closed configuration of the arm member 11.

In this state, in the pressing tube 31, the elastic member 36 is compressed in the direction of the axis Y; however, the adjacent strands 36a are separated from each other by a certain distance.

During the process of pulling back the slider 102 until the first locked portions 16, 17 and the second locked portions 21, 22 of the arm member 11 come into contact with the locking portion 32 of the pressing tube 31 and climb-on to overcome the locking portion 32, when the operator pushes the slider 102 toward the distal end side again, the compressed elastic member 36 extends. Accordingly, the arm member 11 moves toward the distal end side with respect to the pressing tube 31 in a state in which the support portion 67d of the distal member 67 and the pressing tube 31 are in contact with each other.

As a result, the operator may return the first arm 12 and the second arm 13 of the arm member 11 to the open configuration again. In other words, in the process of pulling back the slider 102 until the above-described contact state, the operator may operate the endoscope to grasp the target tissue T again by using the clip 10.

(Climb-on State of Medical Device 1)

Figure 3B:
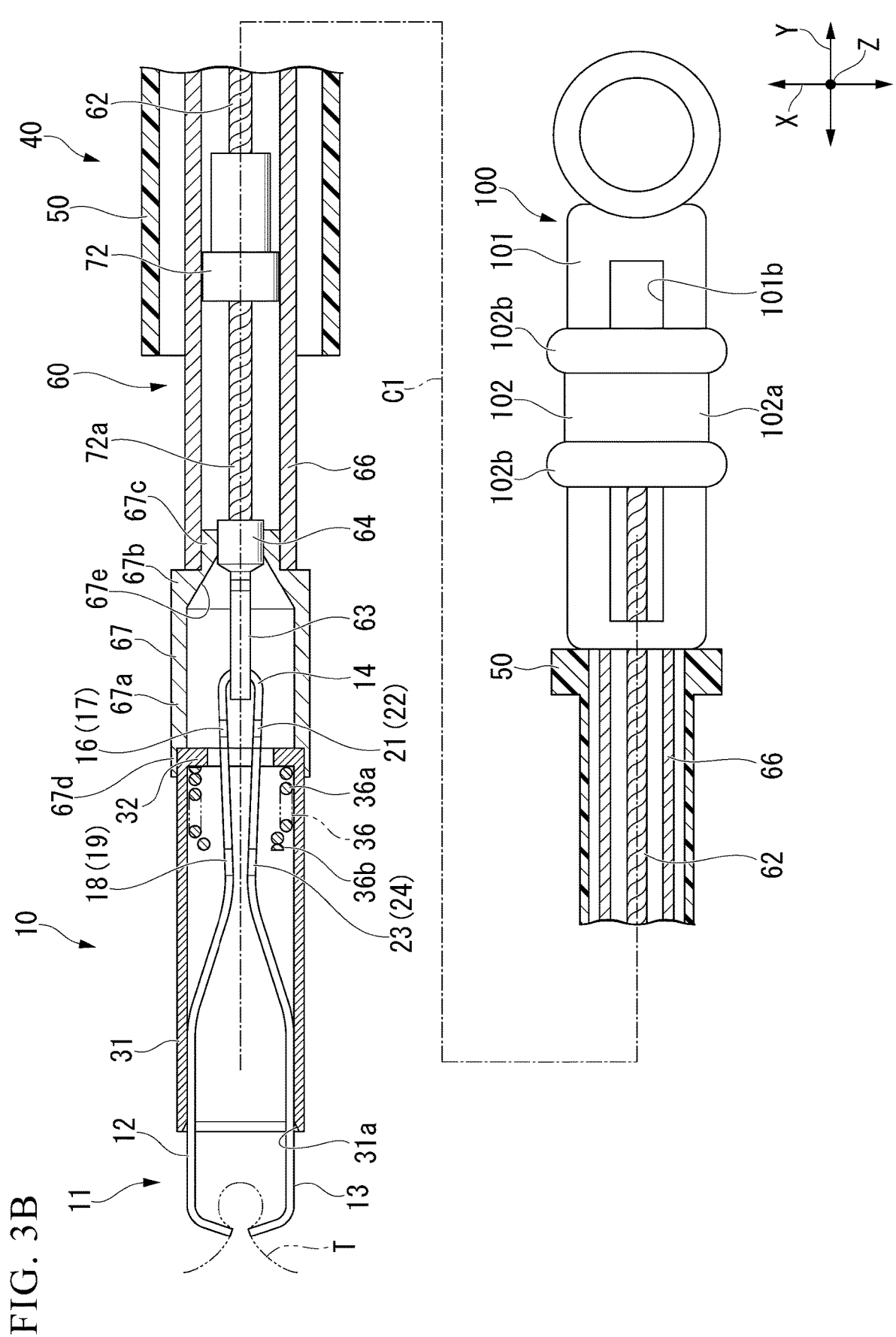
FIG. 3B is a cross-sectional planar view schematically showing the medical device according to the present embodiment.

When the operator further pulls back the slider 102 from the above-described contact state of the medical device 1, the first arm 12 and the second arm 13 of the arm member 11 are further moved to the proximal end side. At this time, as shown in FIG. 3A and FIG. 3B, the first arm 12 and the second arm 13 are elastically deformed in a direction approaching each other and inserted into the locking portion 32. More specifically, the first locked portions 16, 17 of the first arm 12 are inserted into the locking portion 32 in the elastically deformed state.

As a result, as shown in FIG. 3A, when the first locked portions 16, 17 of the first arm 12 pass through the locking portion 32, both the distal end portion of the first locked portion 16 and the distal end portion of the first locked portion 17 abuts the locking portion 32. The arm member 11 enters a climb-on state in which the first locked portions 16, 17 and the second locked portions 21, 22 have overcome the locking portion 32. At this time, the first arm 12 and the second arm 13 of the arm member 11 are maintained in the closed configuration. The engagement configuration in which the clip 10 and the power transmission member 62 are engaged with each other is maintained.

(Locking State of Medical Device 1)

When the force for moving the arm member 11 toward the proximal end side of the pressing tube 31, that is, the force for pulling back the slider 102 to the proximal end side is canceled, the first locked portions 16, 17 and the second locked portions 21, 22 of the arm member 11 are locked to the locking portion 32 at the distal end side by the elastic force of the elastic member 36 such that the medical device 1 enters the locking state.

During the process when the operator pulls back the slider 102 to the proximal end side until the arm member 11 reaches the locking, the operator may push the slider 102 toward the distal end side in the same manner as described above to move the arm member 11 toward the distal end side. Accordingly, the first arm 12 and the second arm 13 of the arm member 11 may be transitioned from the closed configuration to the open configuration. In other words, the target tissue T may be grasped again before the arm member 11 reaches the climb-on state.

In the locking state of the medical device 1, as shown in FIG. 3A, the link member 63 is located inside the distal member 67. However, at this time, the link member 63 is not yet in contact with the inclined-surface portion 67b of the distal member 67. The engagement between the pair of legs 63a of the link member 63 and the central portion 14 of the arm member 11 is maintained. The guide member 64 connected to the proximal end side of the link member 63 may partially enter the proximal end portion 67c of the distal member 67, for example.

As described above, the guide member 64 is formed that the outer diameter of the guide member 64 is slightly smaller than the inner diameter of the proximal end portion 67c of the distal member 67. Accordingly, when the guide member 64 enters the proximal end portion 67c of the distal member 67, the guide member 64 may move along the axis Y direction almost without any wobbling with respect to the proximal end portion 67c. As a result, when the operator pulls back the slider 102 to the proximal end side, the link member 63 connected to the distal end side of the guide member 64 may also move in the distal member 67 toward the proximal end side along the axis Y direction almost without any wobbling.

At this time, in the pressing tube 31, the elastic member 36 is compressed in the direction of the axis Y; however, the elastic member 36 is in the state in which the adjacent wires 36a are separated from each other by a certain distance. In other words, the elastic member 36 may be further compressed.

When the medical device 1 is in the locking state, it is impossible for the operator to push the slider 102 to move the arm member 11 to the distal end side with respect to the pressing tube 31. In other words, it is impossible for the operator to grasp the target tissue T again by using the clip 10. Accordingly, in this state, the state in which the root of the target tissue T is tightly bound by the clip 10 is maintained. The engagement configuration in which the clip 10 and the power transmission member 62 are engaged with each other is maintained.

Thereafter, the operator may release the engagement between the link member 63 and the clip 10 by operating the slider 102 according to the following procedures to indwell the clip 10 in the body.

(Release Operation of Clip 10)

When the operator further pulls the slider 102 back toward the proximal end side, the state in which the first locked portions 16, 17 and the second locked portions 21, 22 of the arm member 11 of the clip 10 are locked to the locking portion 32 is released, and the arm member 11 is further moved to the proximal end side. In other words, together with the movement of the arm member 11 toward the proximal end side, the first locked portions 16, 17 and the second locked portions 21, 22 similarly move to the proximal end side and separate from the locking portion 32. The elastic member 36 is further compressed in the pressing tube 31.

Figure 4A:
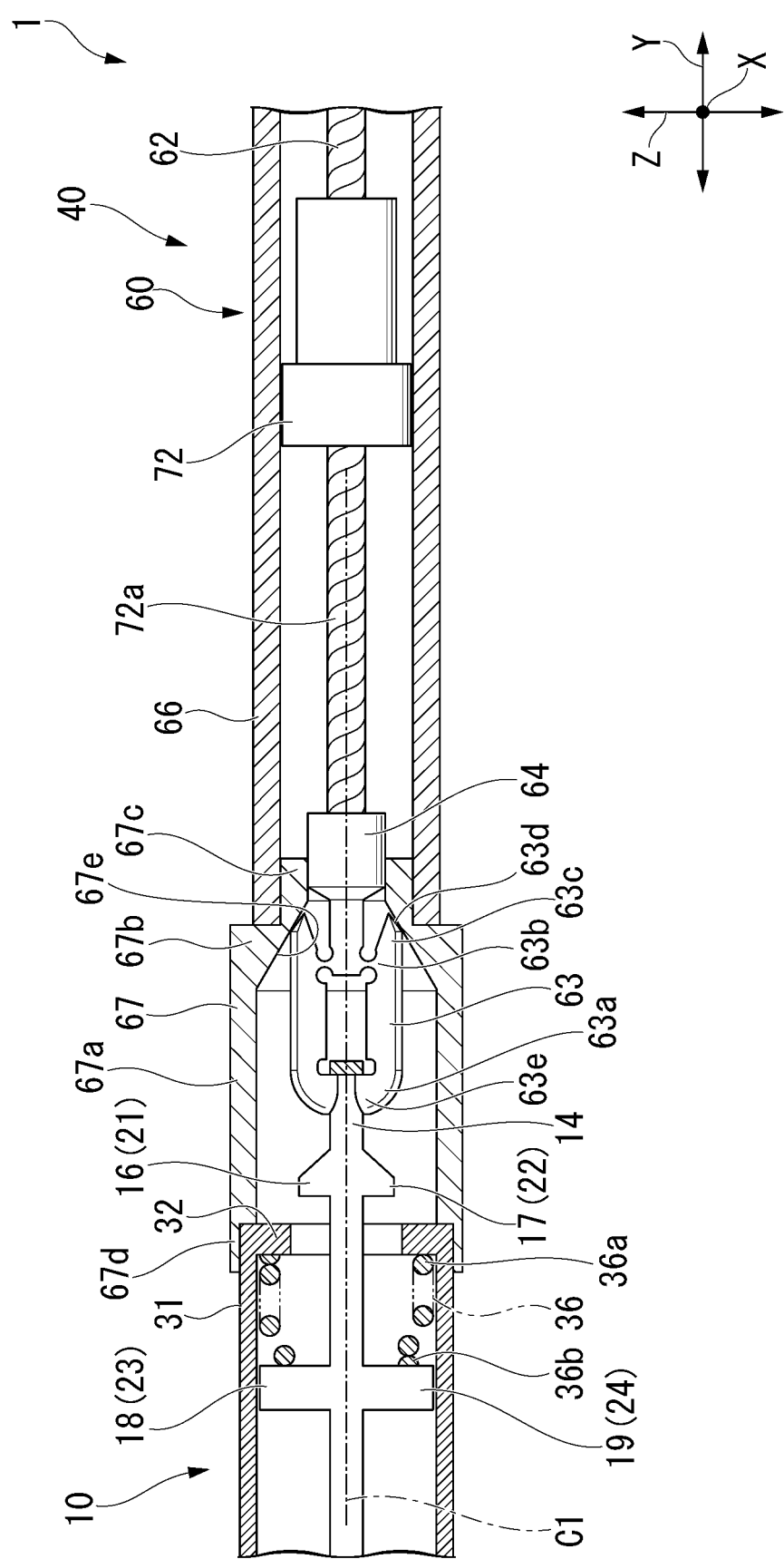
FIG. 4A a cross-sectional side view schematically showing the distal end portion of the medical device according to the present embodiment.

At this time, as shown in FIG. 4A, the link member 63 is moved to the proximal end side in the distal member 67 until the pair of tails 63c of the link member 63 come into contact with the inclined-surface portion 67b of the distal member 67. As described above, the wobbling occurred when the link member 63 moves in the distal member 67 may be prevented by the guide member 64. Accordingly, the link member 63 may move to the proximal end side substantially along the axis Y direction in the distal member 67. As a result, the pair of tails 63c of the link member 63 contact the inclined-surface portion 67b of the distal member 67 at almost the same time. During the process, the engagement configuration in which the clip 10 and the power transmission member 62 are engaged with each other is maintained.

Figure 4C:
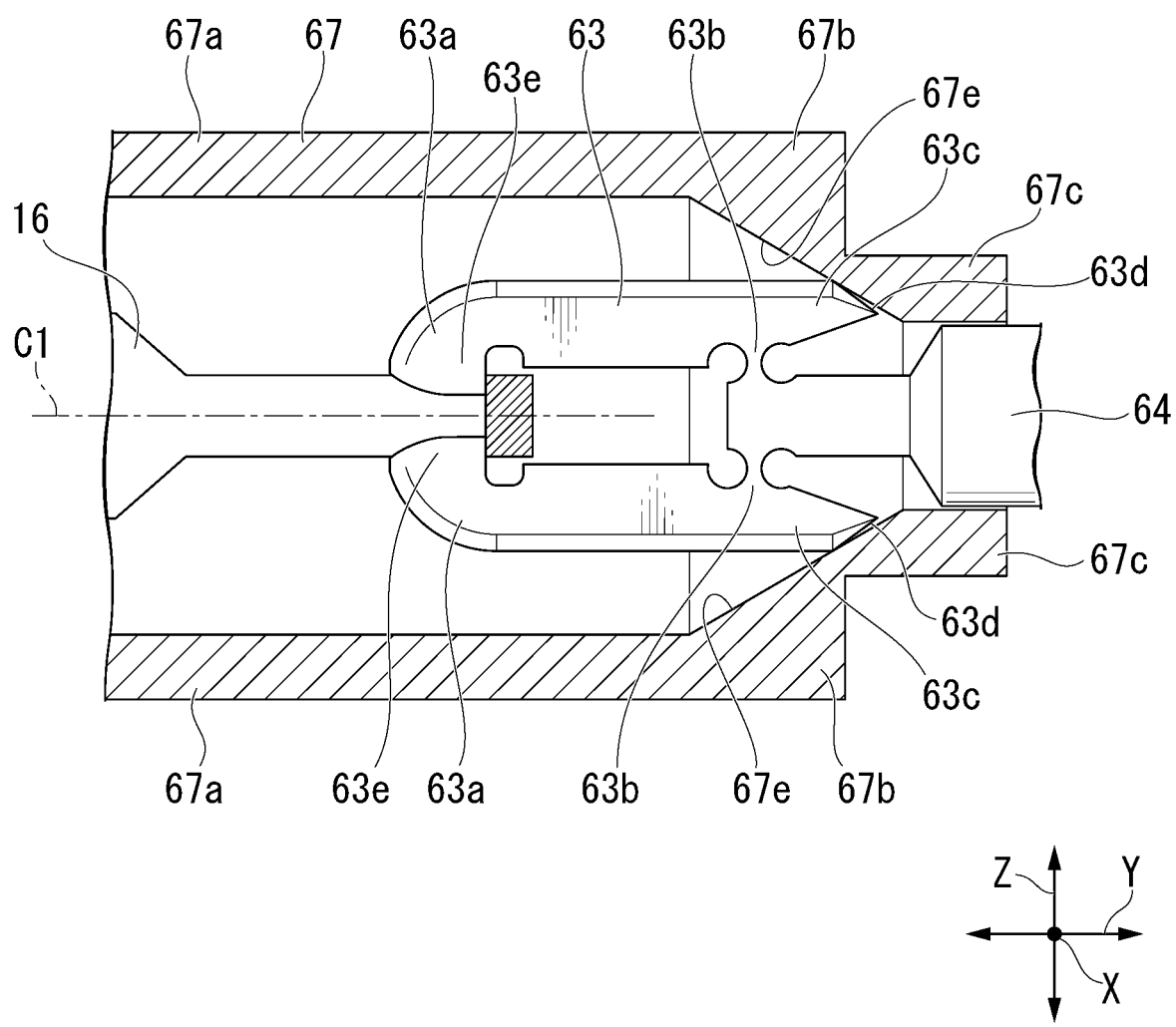
FIG. 4C is an enlarged view showing the distal end portion of the medical device in FIG. 4A.

FIG. 4C is a view showing the state in which the pair of tails 63c of the link member 63 are in contact with the inclined-surface portion 67b of the distal member 67. According to the present embodiment, for example, each of the proximal end surfaces 63d of the pair of tails 63c of the link member 63 and the inner circumferential surface 67e corresponding to the inclined-surface portion 67b of the distal member 67 may be configured to intersect with each other. In other words, the proximal end surfaces 63d of the pair of tails 63c of the link member 63 and the inner circumferential surface 67e of the inclined-surface portion 67b of the opposite distal member 67 are not parallel to each other. In other words, an angle formed by the proximal end surface 63d of the tail 63c and the axis C1 may be different from an angle formed by the inner circumferential surface 67e of the inclined-surface portion 67b of the distal member 67 and the axis C1.

Since the medical device 1 according to the present embodiment has the above-described configuration, when the pair of tails 63c of the link member 63 abut the inclined-surface portion 67b, there is no case where the two surfaces of the proximal end surface 63d and the inner circumferential surface 67e are completely in contact with each other. As shown in FIG. 4C, for example, only one point at the distal end of the proximal end surface 63d may be in contact with the inner circumferential surface 67e.

According to the present embodiment, the case in which only one point at the distal end of the proximal end surface 63d is in contact with the inner circumferential surface 67e is described as an example; however, the contact configuration of the pair of tails 63c of the link member 63 and the inclined-surface portion 67b of the distal member 67 is not limited thereto. For example, in the portion where the pair of tails 63c and the distal member 67 are opposite to each other, an inclined surface may be formed in only one of the pair of tails 63c and the distal member 67 and a protrusion or the like may be formed in the other one of the pair of tails 63c and the distal member 67.

Next, in the state in which the pair of tails 63c of the link member 63 are in contact with the inclined-surface portion 67b of the distal member 67, when the operator further pulls the slider 102 back toward the proximal end side, the distal end of the proximal end surface 63d of the tail 63c moves toward the proximal end side along the inner circumferential surface 67e while abutting the inner circumferential surface 67e.

During the process, the tail 63c and the inclined-surface portion 67b press each other at a contact portion between the tail 63c and the inner circumferential surface 67e. Accordingly, two forces of the pulling force toward the proximal end side and the pressing force received by the tail 63c from the inclined surface 67b at the contact portion between the tail 63c and the inner circumferential surface 67e are applied to the link member 63. Since the action lines of the two forces are not coincided with each other, a moment due to the two forces is generated and applied to the link member 63.

Figure 5C:
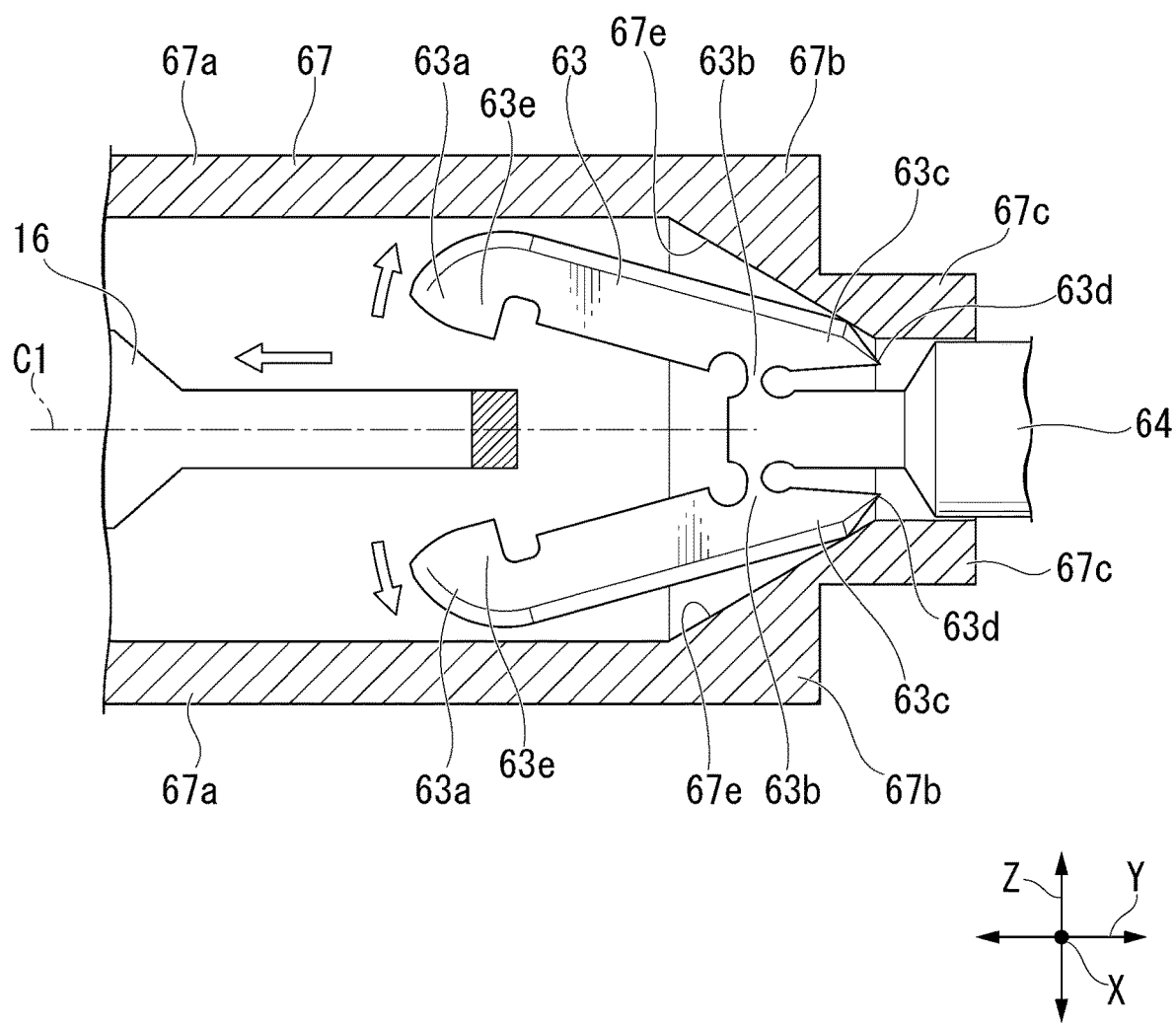
FIG. 5C is an enlarged view showing the distal end portion of the medical device in FIG. 5A.

As described above, in the link member 63, the pair of deformed portions (fulcrum portions) 63b formed to extend in the direction intersecting the axis C1 are the thinnest portions. Accordingly, according to the present embodiment, when the above-described moment applies on the link member 63, a large elastic deformation occurs in the deformation portion 63b as compared with other portions of the link member 63. When the deformation portion 63b is elastically deformed, as shown in FIG. 5C, the pair of legs 63a of the link member 63 are rotated in the direction separating from the axis C1 with the elastically deformed deformation portions 63b as the fulcrums, in other words, rotated outwardly from the longitudinal axis direction of the link member 63. On the other hand, the pair of tails 63c of the link member 63 move toward the proximal end side along the inner circumferential surface 67e while the distal ends of the pair of tails 63c contacting the inner circumferential surface 67e of the inclined-surface portion 67b. In other words, the pair of tails 63c of the link member 63 rotate in a direction approaching the axis C1, that is, inwardly toward the longitudinal axis direction of the link member 63. As a result, the link member 63 is deformed such that the pair of legs 63a open outwardly from the longitudinal axis direction.

According to the present embodiment, since the outer diameter of the guide member 64 is slightly smaller than the inner diameter of the proximal end portion 67c of the distal member 67, the link member 63 connected to the distal end side of the guide member 64 moves toward the proximal end side along the axis Y direction almost without any wobbling. Accordingly, the pair of tails 63c come into contact with the inner circumferential surface 67e of the inclined-surface portion 67b of the distal member 67 at substantially the same time. Since the pair of tails 63c move toward the proximal end side while contacting the inner circumferential surface 67e at substantially the same time, the moments applied to the pair of deformation portions 63b are substantially the same. Accordingly, the pair of legs 63a may be rotated outwardly from the longitudinal axis direction of the link member 63 at almost the same time. As a result, it is possible to prevent the moments from concentrating on either one of the pair of legs 63a such that the engagement between the link member 63 and the arm member 11 may be smoothly released.

When the engagement between the link member 63 and the arm member 11 is released, as shown in FIG. 5A and FIG. 5B, the elastic member 36 is in the state of being further compressed in the pressing tube 31. In this state, for example, the elastic member 36 may be compressed in the state in which the adjacent strands 36a in the axial direction Y are in close contact with each other.

As shown in FIG. 5B, in the state in which the target tissue T is grasped between the first arm 12 and the second arm 13 of the arm member 11, the closed configuration of the arm member 11 is maintained. The clip 10 and the power transmission member 62 are transitioned from the engagement configuration to the separation configuration.

According to the present embodiment, in the state in which the target tissue T is grasped by the arm member 11 in the closed configuration, the position where the pair of tails 63c of the link member 63 abut the inclined-surface portion 67b of the distal member 67 and the pair of legs 63a is opened is defined as a second position of the link member 63. In other words, according to the present embodiment, when the link member 63 is moved to the second position by the power transmission member 62, the clip 10 and the power transmission member 62 are transitioned from the engagement configuration to the separation configuration.

Figure 6A:
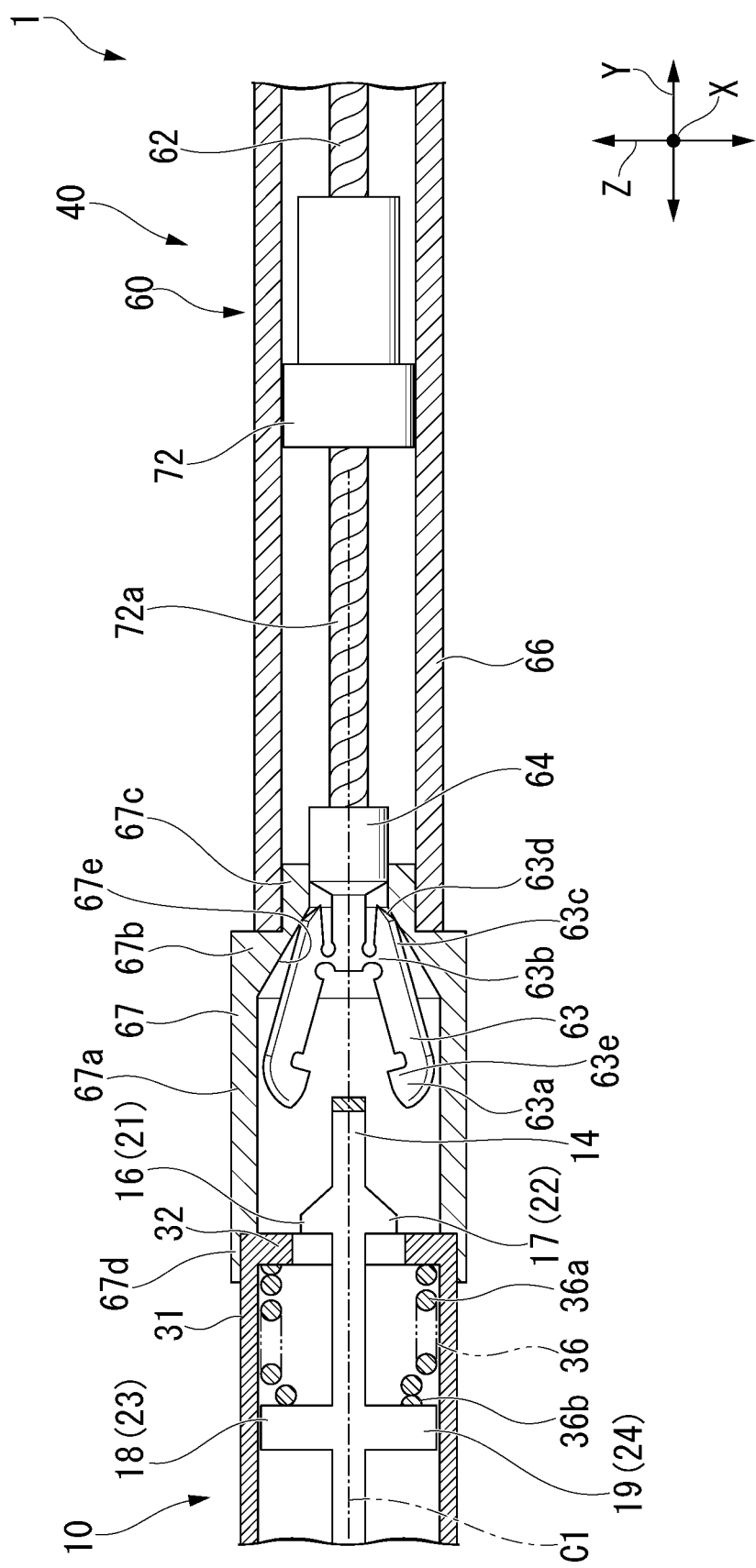
FIG. 6A is a cross-sectional side view schematically showing the distal end portion of the medical device according to the present embodiment.

When the engagement between the link member 63 and the arm member 11 is released, the arm member 11 moves toward the distal end side by the elastic force of the compressed elastic member 36. Accordingly, as shown in FIGS. 6A and 6B, the arm member 11 is restored to the locking state in which the first locked portions 16, 17 and the second locked portions 21, 22 are locked to the locking portion 32 from the distal end side. In other words, the central portion 14 of the arm member 11 moves along the axis Y direction from the position between the pair of legs 63a of the link member 63 toward the distal end side. In this state, even if the pair of legs 63a of the link member 63 are closed again, it is not possible to clamp the central portion 14 of the arm member 11.

Figure 7A:
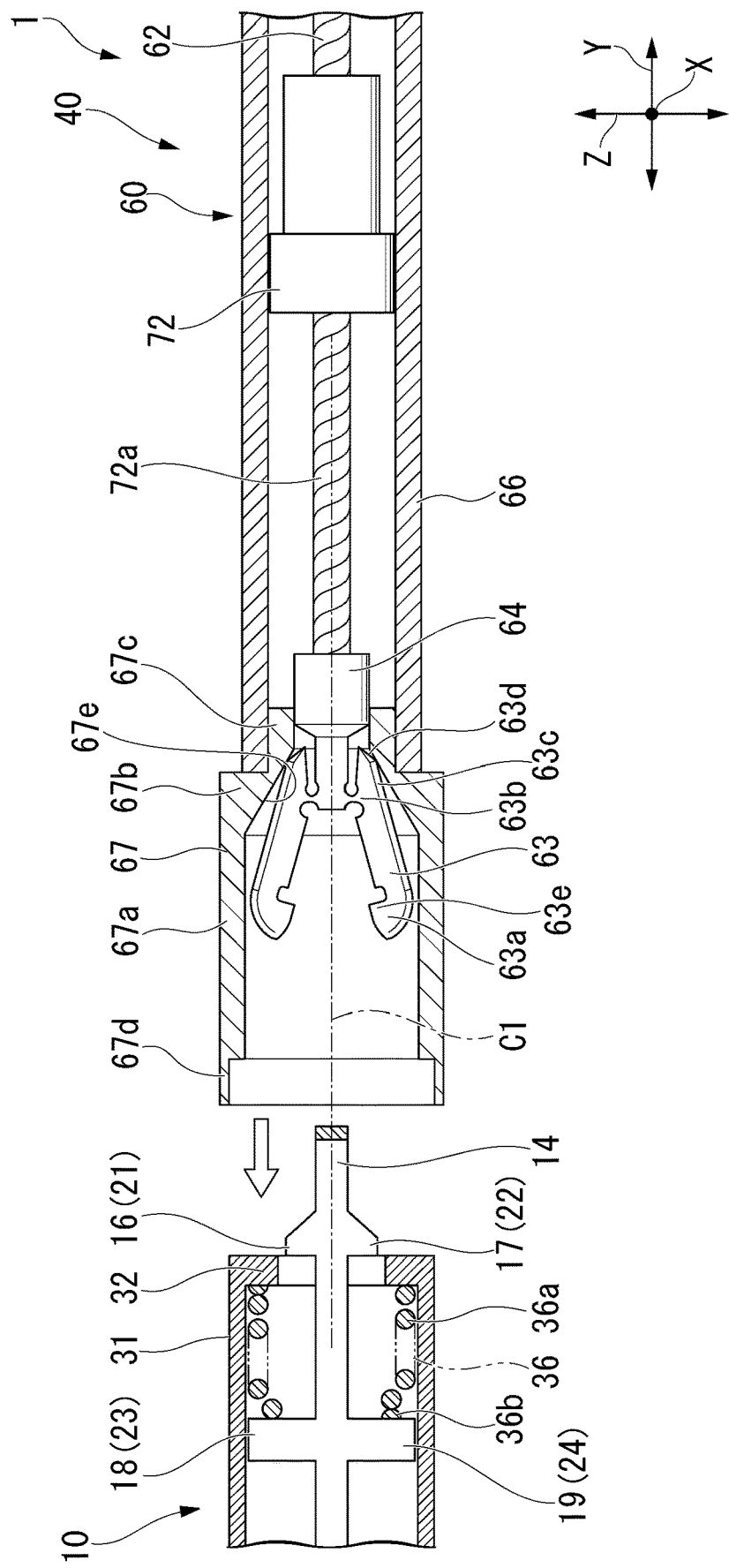
FIG. 7A is a cross-sectional side view schematically showing the distal end portion of the medical device according to the present embodiment.

When the clip 10 and the power transmission member 62 are transitioned to the separation configuration, since there is no force in balance with the elastic force of the compressed elastic member 36, as shown in FIG. 7A and FIG. 7B, the engagement between the pressing tube 31 and the support portion 67d of the distal member 67 is released.

Accordingly, the entire clip 10 including the pressing tube 31 move toward the distal end side with the target tissue T being grasped by the arm member 11. In other words, the clip 10 is separated from the treatment tool main body 40.

As a result, the clip 10 may be indwelled in the body with the target tissue T being grasped.

Thereafter, when the operator slightly pushes the slider 102 toward the distal end side to release the engagement between the pair of tails 63c of the link member 63 and the inclined-surface portion 67b of the distal member 67, the pair of legs 63a are closed again. In this state, the operator may remove the medical device 1 from the body and attach the clip 10 again to perform the treatment.

As described above, the procedure for ligating the target tissue T using the medical device 1 according to the present embodiment is finished.

(Effect of Medical Device 1)

According to the medical device 1 according to the present embodiment, by pulling back the slider 102 of the operation unit 100, the engagement between the link member 63 and the arm member 11 may be released when the link member 63 and the arm member 11 are moved together from the first position of the link member 63 when the arm member 11 of the clip 10 is in the open configuration to the second position where the link member 63 is in contact with the distal member 67 and when the arm member 11 of the clip 10 is in the closed configuration.

According to the present embodiment, the first position of the link member 63 may be arranged at the position where the link member 63 is disposed when the target tissue T as the treatment target is between the first arm 12 and the second arm 13 of the arm member 11. The second position of the link member 63 may be the position where the link member 63 and the distal member 67 come into contact with each other. Accordingly, in the process in which the operator operates the slider 102 and pulls back the power transmission member 62, the maximum amount of force required for the operator to pull back the slider 102 of the operation portion 100 is the force for causing the first locked portions 16, 17 and the second locked portions 21, 22 of the arm member 11 to climb on and overcome the locking portion 32.

In other words, according to the medical device 1 of the present embodiment, it becomes easier to indwell the clip 10 by securing the stroke of the link member 63 from the first position to the second position and controlling the retraction amount of the power transmission member 62 toward the proximal end side by operating the slider 102.

The example in which the link member 63 includes the pair of legs 63a has been described above; however, the configuration of the medical device 1 according to the present embodiment is not limited thereto. For example, the medical device 1 may be configured to have only one of the pair of legs 63a. In other words, in the medical device 1 according to the present embodiment, the link member 63 may be configured to have only one set of the leg 63a, the deformation portion 63b, and the tail 63c that are integrally formed.

In this case, in the medical device 1, the folded-back portion 63e of the link member 63 has a shape such as a hook or the like, and the arm member 11 and the link member 63 are engaged with each other by hooking the folded-back portion 63e to by the central portion 14 of the arm member 11. In the link member 63, the tail 63c integrally formed with the leg 63a abuts the inclined surface 67e of the distal member 67 such that the deformation portion 63b may also be largely elastically deformed. As a result, the leg 63a of the link member 63 is rotated in the direction separating from the axis C1, that is, outwardly from the longitudinal axis direction of the link member 63. At this time, the engagement between the link member 63 and the arm member 11 may be released by releasing the engagement between the folded-back portion 63e of the link member 63 and the central portion 14 of the arm member 11.

The medical device 1 in which the link member 63 includes only one leg 63a may include a pair of tails 63c. In the medical device 1, the guide member 64 is configured to cause the pair of tails 63c to contact the inclined surface 67e of the distal member 67 almost at the same time by pulling back the clip 10 toward the proximal end side along the axis C1. However, between the pair of tails 63c, only the tail 63c integrally formed with the leg 63a may be rotated due to the elastic deformation of the deformation portion 63b, and the state in which the other tail 63c abuts the inclined surface 67e is maintained. As a result, in the medical device 1, similarly to the above-described embodiment, the leg 63a may be stably rotated in the direction separating from the axis C1.

An example in which the central portion 14 of the arm member 11 is sandwiched by the pair of legs 63a of the link member 63, that is, the arm member 11 and the link member 63 are directly engaged is described; however, the configuration of the medical device 1 according to the present embodiment is not limited thereto. For example, another member may be further arranged between the arm member 11 and the link member 63.

(Modification of Medical Device 1)

Next, a modification of the medical device 1 according to the present embodiment will be described. Hereinafter, a description of the same configuration as the medical device 1 according to the present embodiment will be omitted, and the description will focus on the differences from the present embodiment.

The medical device (ligation device, clip device) according to the present modification of the present embodiment is configured to have a link member 73 instead of the link member 63 according to the above-described embodiment.

Figure 8A:
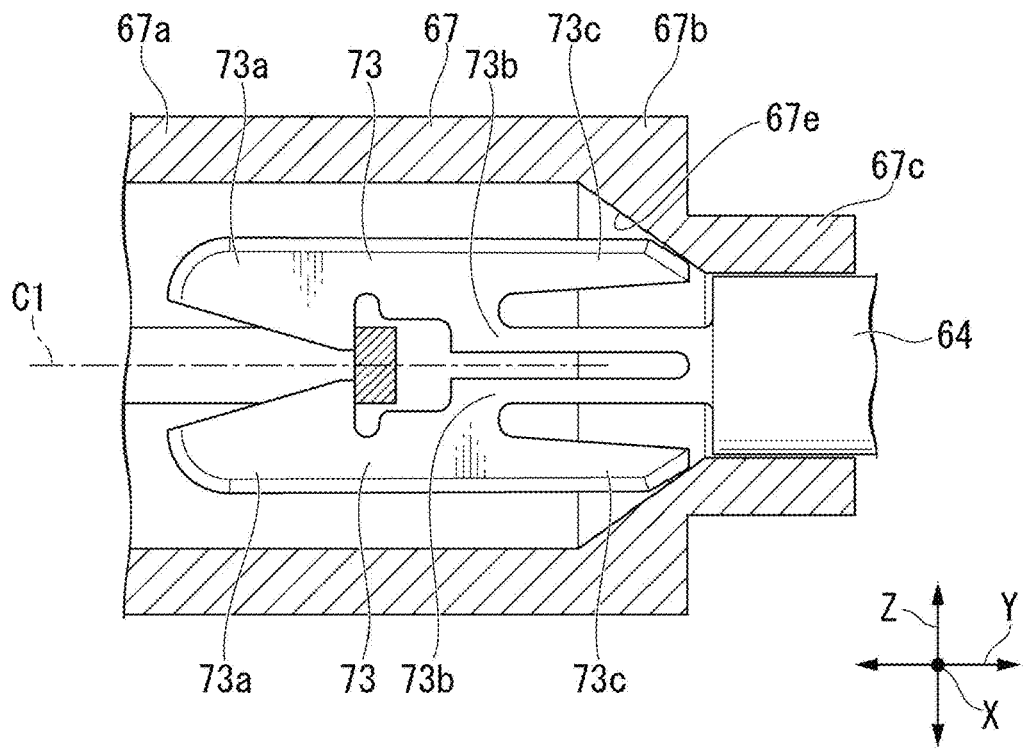
FIG. 8A is a cross-sectional side view schematically showing a distal end portion of a medical device according to a modification of the present embodiment.
Figure 8B:
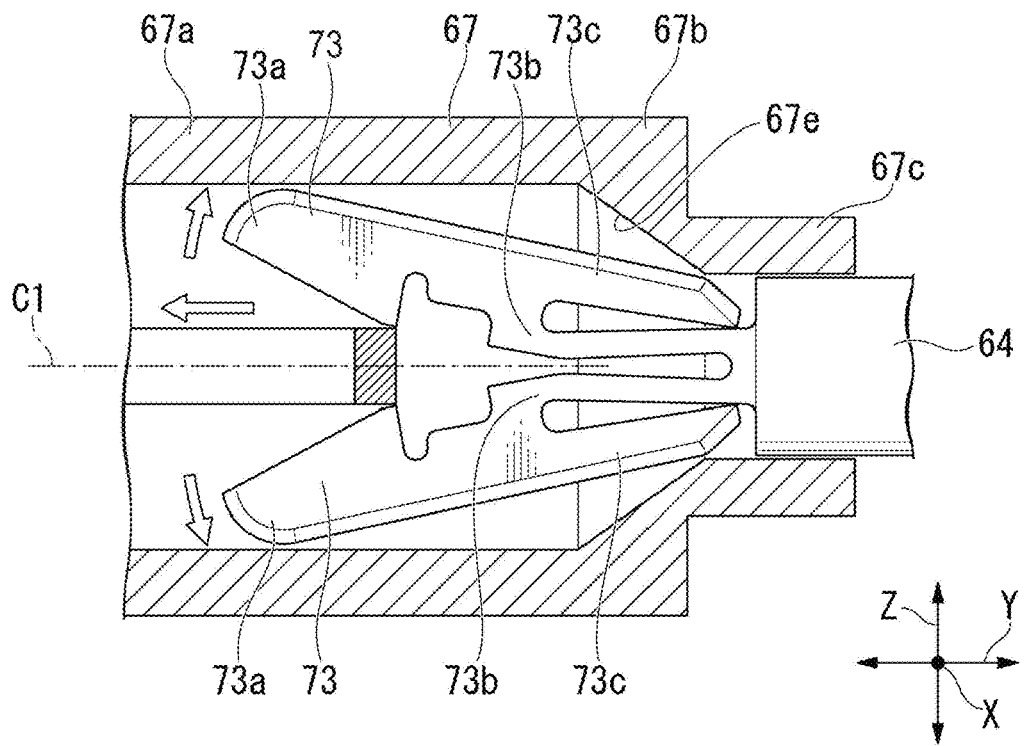
FIG. 8B is a cross-sectional planar view schematically showing the medical device according to the present modification.

As shown in FIG. 8A and FIG. 8B, the link member 73 includes a pair of openable and closable legs 73a at the distal end side, a pair of deformation portions (fulcrum portions) 73b, and a pair of tails 73c where inclined surfaces are formed at the proximal end side. According to the present modification, the link member 73 may be integrally formed of a metal material such as stainless steel or the like.

The link member 73 according to the present modification, the deformed portion 73b is formed in a different shape when compared with the link member 63 according to the above-described embodiment. More specifically, as shown in FIG. 8A and FIG. 8B, for example, the deformation portion 73b of the link member 73 according to the present modification may be formed in a portion that is substantially parallel to the axis C1 and is connected to the guide member 64. The width of the deformation portion 73b in the direction orthogonal to the axis C1 is not particularly limited; however, the width thereof may be set such that the deformable portion 73b is capable of being repeatedly elastically deformed.

Other configurations of the medical device according to the present modification may be the same as the configurations of the medical device 1 according to the above-described embodiment.

According to the medical device according to the present modification, as shown in FIG. 8B, the operator pulls the slider 102 back toward the proximal end side such that the pair of tails 73c of the link member 73 are in contact with the inclined-surface portion 67b of the distal member 67. At this time, similar to the medical device 1 according to the above-described embodiment, each of the pair of legs 73a is rotated in the direction separating from the axis C1 with the deformation portion 73b of the link member 73 as the fulcrum, that is, each of the pair of legs 73a is rotated outwardly from the longitudinal axis direction of the link member 73. On the other hand, the pair of tails 73c of the link member 73 moves toward the proximal end side along the inner circumferential surface 67e while contacting the inner circumferential surface 67e of the inclined surface portion 67b. The pair of tails 73c of the link member 73 are rotated in a direction approaching the axis C1, that is, inwardly to the longitudinal axis direction of the link member 63. As a result, the link member 73 is deformed by the pair of legs 73a opening outwardly from the longitudinal axis direction.

As a result, the engagement state between the link member 73 and the arm member 11 is released, and the clip 10 including the arm member 11 is moved to the distal end side by the elastic force of the elastic member 36 disposed in the pressing tube 31. In this manner, similar to the medical device 1 according to the above-described embodiment, the clip 10 of the medical device according to the present modification may be indwelled in the body.

The medical device according to the present modification has the same effect as the medical device 1 according to the above-described embodiment. According to the medical device of the present modification, the deformation portion 73b of the link member 73 has a larger area for receiving the force than that of the deformation portion 63b of the link member 63 according to the above-described embodiment so as to prevent concentration of the force. Accordingly, the medical device according to the present modification has higher durability and may be repeatedly used to perform treatment.

(Effect of Medical Device 1)

Hereinafter, from the viewpoint of the relationship between the amount of pulling back the slider 102 and the amount of operating force necessary for pulling back the slider 102 during the operation of indwelling the clip in the body by using the clip device according to the present disclosure, the effect of the clip device according to the present disclosure will be described again.

FIG. 9 is a view showing a change of the operation force in each stage during the operation of indwelling the clip 10 in the body by using the medical device 1 or the medical device according to the present disclosure and the conventional endoscope treatment device (for example, the endoscope treatment device disclosed in Japanese Patent (Granted) No. 5750620).

In FIG. 9, the horizontal axis represents the amount of pulling back the slider 102 by the operator to the proximal end side, and the vertical axis represents the amount of force required to pull back the slider 102. In FIG. 9, the solid line indicates the medical device 1 or the medical device according to the present disclosure, and the broken line indicates the conventional endoscope treatment device.

In the following description, an example of the medical device 1 according to the above-described embodiment will be described; however, the medical device according to the modified example has the same effect.

In a region R1 shown in FIG. 9, an operation from the initial state (the arm member 11 is in the open configuration) of the medical device 1 according to the above-described embodiment until the arm member 11 is transitioned to the closed configuration is shown. The region R1 shown in FIG. 9 corresponds to the operation in which the arm member 11 of the medical device 1 is transitioned from the open configuration (see FIG. 1B) to the closed configuration (see FIG. 2B) by the operator pulling back the slider 102. In this region R1, the first arm 12 and the second arm 13 of the arm member 11 resist the resistance of the target tissue T located therebetween and tightly bind the root of the target tissue T. As the distance between the first arm 12 and the second arm 13 of the arm member 11 decreases, the resistance of the target tissue T increases such that the amount of force required for the operator to pull back the slider 102 also increases.

In the region R1, in the case of the conventional endoscope treatment device, since the same operation is performed, the required amount of force increases as the amount by which the operator pulls back the slider increases.

In a region R2 shown in FIG. 9, the operation of pulling back the slider 102 while maintaining the closed configuration of the arm member 11 of the medical device 1 to cause the medical device 1 to be transitioned to the locking state of the medical device 1 through the contact state of the medical device 1 is shown.

In the region R2, since the operation until the contact state of the medical device 1 is only to pull back the arm member 11 to the proximal end side while maintaining the closed configuration of the arm member 11, the required amount of force is temporarily reduced as the amount of pulling back the slider 102 by the operator increases. In the operation from the contact state of the medical device 1 to the locking state of the medical device 1, in the arm member 11, since the first locked portions 16, 17 and the second locked portions 21, 22 are pulled back to the proximal end side while contacting the locking portion 32, the required amount of force increases as the amount of pulling back the slider 102 by the operator increases. The amount of force F1 required to cause the clip 10 to enter the climb-on state as shown in FIG. 9 is, for example, about 20 to 50 N (Newton).

In the region R2, in the case of the conventional endoscope treatment device, since the same operation is performed, the relationship between the amount of pulling back the slider by the operator and the required force is the same as that of the medical device 1 according to the present embodiment.

In the region R3 shown in FIG. 9, an operation of indwelling (releasing) the clip 10 of the medical device 1 according to the present embodiment is shown. According to the medical device 1 according to the present embodiment, the operator pulls back the slider 102 to release the locking state of the medical device 1 as shown in FIG. 4A and FIG. 4B, and the link member 63 and the arm member 11 are pulled back to the proximal end side. At this time, since the elastic member 36 provided in the presser tube 31 is further compressed until it is in the tightly wound state, the required amount of force increases as the amount of pulling back the slider 102 by the operator increases. Thereafter, as shown in FIG. 5A and FIG. 5B, the link member 63 of the medical device 1 is pulled back toward the proximal end side while engaging with the inclined-surface portion 67b of the distal member 67 so as to release the engagement between the link member 63 and the arm member 11, the required amount of force increases as the amount of pulling back the slider 102 by the operator increases.

However, as shown in FIG. 9, according to the medical device 1 according to the present embodiment, the amount of force required for releasing the engagement between the link member 63 and the clip 10, that is, the amount of force necessary for indwelling the clip 10 is smaller than the amount of the force F1 required to cause the clip 10 to enter the climb-on state.

In the region R3, an increase rate of required force for pulling back the slider 102 per unit movement amount is smaller than that in the region R2. In other words, in the region R3, a change in force characteristic with a relatively gently slope is shown; however, in the region R2 where the first locked portions 16, 17 and the second locked portions 21, 22 contact the locking portion 32, a change in the force characteristic with a relatively sudden slope is shown.

On the other hand, in the case of the conventional endoscope treatment device, when the endoscope treatment device is in the locking state, the spiral spring provided in the pressing tube is compressed into a substantially tightly wound state, and it is impossible for the spring to be further compressed. In other words, when the conventional endoscope treatment tool is in the locking state, the clip is impossible to move to the proximal end side with respect to the pressing tube. However, when the operator pulls back the slider 102, the tension applied to the breaking mechanism and the power transmission member gradually increases.

As described above, in the conventional endoscope treatment tool, the amount of force required to break the breaking mechanism has to be set to be large corresponding to the physical properties (rigidity) of the tissue to be treated. Accordingly, in the region R3' shown in FIG. 9, the amount of force required to release the engagement between the clip and the power transmission member, that is, the amount of force required for indwelling the clip is equal to or larger than the necessary amount of force F1 for causing the clip 10 to enter the climb-on state. Thereafter, when the amount of force of pulling back the slider by the operator reaches the amount of force necessary to break the breaking mechanism, the breaking mechanism breaks, and the engagement between the clip and the power transmission member may be released.

As described above, according to the medical device 1 or the medical device according to the present embodiment, during the operation of indwelling the clip 10 in the body from the state in which the arm member 11 of the medical device 1 is in the open configuration, the required amount of force for pulling back the slider 102 toward the proximal end side by the operator is equal to or less than the amount of force F1 for causing the clip 10 to enter the climb-on state. On the other hand, in the case of the conventional endoscope treatment tool, during the operation of indwelling the clip in the body, the required amount of force for pulling back the slider toward the proximal end side by the operator is equal to or larger than the amount of force F1 for causing the clip 10 to be transitioned to the climb-on state.

According to the medical device 1 according to the present embodiment, the engagement between the link member 63 and the clip 10 may be released by moving the link member 63 from the first position of the link member 63 when the arm member 11 of the clip 10 is in the open configuration to the second position where the link member 63 is in contact with the distal member 67 and when the arm member 11 of the clip 10 is in the closed configuration. During the treatment process, in order to indwell the clip 10 in the body, the required amount of force necessary for the operator to pull back the slider 102 to the proximal end side is equal to or less than the required amount of force F1 to cause the clip 10 to be transitioned to the climb-on state. According to the present embodiment, for example, the force F1 required to cause the clip 10 to be transitioned to the climb-on may be determined corresponding to the necessary amount of force for causing the first locked portions 16, 17 and the second locked portions 21, 22 of the arm member 11 to climb on and overcome the locking portion 32.

Accordingly, according to the medical device 1 according to the present embodiment, even if the target tissue T having different physical properties (rigidity) is about to be treated, the force required to indwell the clip 10 in the body may be controlled to be equal to or less than a predetermined value, and the operability may be improved.

According to the medical device 1 according to the present embodiment, since the link member 63 is configured to have the rigidity that can be repeatedly elastically deformed, it is possible to repeatedly indwell a plurality of clips 10 in the body.

According to the present embodiment, the example of inserting the clip device into the channel of the endoscope having flexibility has been described; however, the configuration according to the present disclosure is not limited thereto. For example, the clip device may also be applied to a slave manipulator in a medical master-slave manipulator system. In this case, the power transmission member may be, for example, a rod attached to the slave manipulator.

According to the present embodiment, an example of indwelling a clip for ligating the target tissue T in the body has been described; however, the configuration of the present disclosure is not limited thereto. For example, the configuration of the clip device according to the present disclosure may be applied to a medical device (more specifically, a ligation device) for leaving a stent, a snare, or the like in the body.

Figure 10:
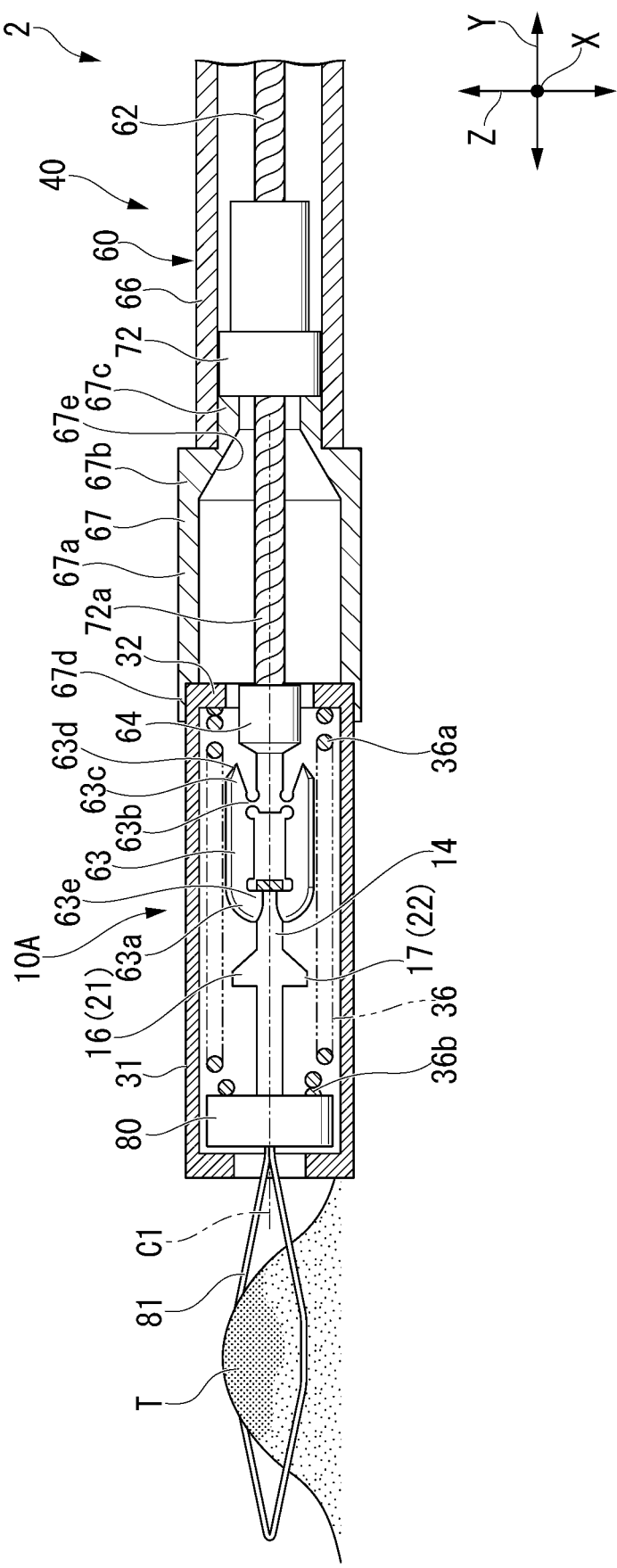
FIG. 10 is a view showing a modification of the clip unit according to the present embodiment.
Figure 11:
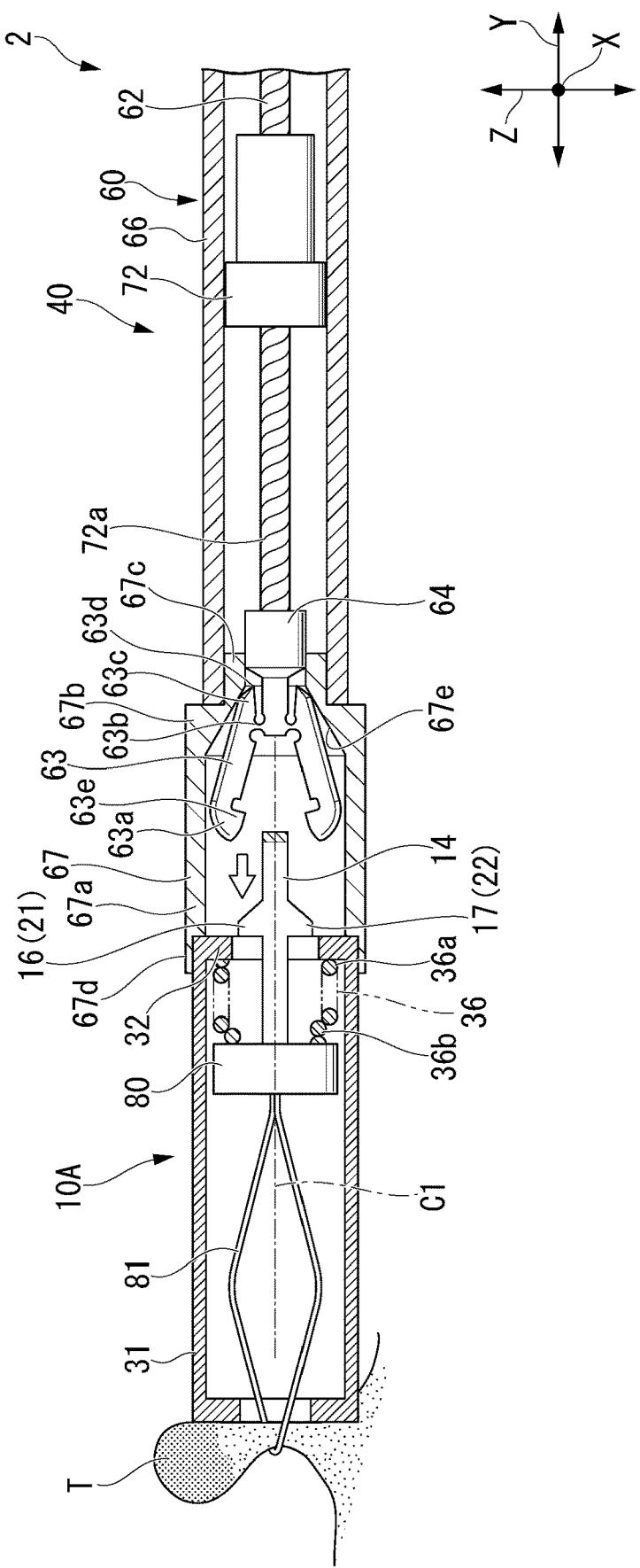
FIG. 11 is a view showing a modification of the clip unit according to the present embodiment.

In this case, for example, as shown in FIG. 10 and FIG. 11, a medical device (ligation device) 2 for indwelling the treatment device 10A having a snare loop 81 in the body is configured. As shown in FIG. 10, the treatment tool 10A is configured by using the elastic member 36 to connect a tubular fixing member 80 disposed in the pressing tube 31 and the locking portion 32 of the pressing tube 31. The snare loop 81 is connected to the distal end side of the fixing member 80. A pair of arm members having the first locked portions 16, 17 and the central portion 14 are connected to the proximal end side of the fixing member 80. Similar to the disclosure shown above, the first locked portions 16, 17 may overcome the locking portion 32 of the pressing tube 31 and be locked to the locking portion 32. As shown in FIG. 10, when the link member 63 and the treatment device 10A are engaged with each other, the snare loop 81 and the fixing member 80 may integrally advance and retract due to the advancement and retraction of the power transmission member 62. More specifically, when the snare loop 81 advances, the area of the loop shape formed by itself increases, and when the snare loop 81 retracts, the area of the loop shape formed by itself decreases.

As shown in FIG. 10, in the medical device 2, a state in which the area of the loop shape formed by the snare loop 81 itself becomes the maximum area, or a state in which the area of the loop shape formed by the snare loop 81 itself is equal to or larger than the range of the target tissue T is defined as the open configuration of the snare loop 81. The position where the pair of legs 63a of the link member 63 are located when the snare loop 81 is in the open configuration is defined as the first position of the link member 63. As shown in FIG. 10, the central portion 14 of the treatment device 10A is sandwiched by the folded-back portions 63e formed on the distal ends of the pair of legs 63a of the link member 63 such that the link member 63 and the treatment instrument 10A are engaged with each other. In other words, as shown in FIG. 10, when the link member 63 is at the first position, the link member 63 and the treatment device 10A having the snare loop 81 in the open configuration are in the engagement configuration.

As shown in FIG. 11, in the medical device 2, when the power transmission member 62 is pulled back toward the proximal end side, the area of the loop shape formed by the snare loop 81 decreases, and the root of the target tissue T is tightly bound by the snare loop 81. The state in which the area of the loop shape formed by the snare loop 81 is decreased and the root of the target tissue T is tightly bound is defined as the closed configuration of the snare loop 81. The link member 63 that moves together with the power transmission member 62 that is pulled back to the proximal end side contacts the distal member 67, more specifically, when the pair of tails 63c contact the inclined-surface portion 67b of the distal member 67, similar to the above-described medical device 1 and the medical device, a large elastic deformation occurs in the deformation portion 63b. The position of the link member 63 when the pair of tails 63c come into contact with the inclined-surface portion 67b is defined as the second position of the link member 63. As shown in FIG. 11, when the link member 63 is at the second position, the pair of legs 63a of the link member 63 are deformed by opening outwardly from the axis C1 (central axis of the link member 63). As a result, the engagement between the folded-back portion 63e formed at the distal ends of the pair of legs 63a and the central portion of the treatment device 10A is released. At this time, the first locked portions 16, 17 of the treatment device 10A pass through the locking portion 32 and are locked by the locking portion 32. In other words, as shown in FIG. 11, when the link member 63 is at the second position, the engagement between the link member 63 and the treatment device 10A is released with the snare loop 81 maintaining the closed configuration. As a result, the treatment device 10A having the snare loop 81 tightly binding the root of the target tissue T is indwelled at a predetermined site. As shown in FIG. 11, when the link member 63 comes into contact with the inclined-surface portion (release mechanism) 67b of the distal member 67 at the second position, the engagement configuration between the link member 63 and the treatment device 10A having the snare loop 81 in the closed configuration is released, and the engagement configuration is transitioned to the separation configuration.

According to the disclosure shown above, in the medical device 2, when the link member 63 is moved from the first position to the second position by the power transmission member 62, the link member 63 contacts the inclined-surface portion (release mechanism) 67b of the distal member 67 such that the power transmission member 62 and the treatment device 10A may be transitioned from the engagement configuration to the separation configuration.

The configuration of the medical device 2 having the link member 63 with the pair of legs 63a has been described above as an example; however, even in this case, the link member 63 may have only one leg 63a similar to the disclosure shown above. In the medical device 2, the link member 63 and the treatment device 10A may be connected via another member. Furthermore, in the medical device 2, the shape of the snare loop 81 is not particularly limited. For example, the snare loop 81 may be formed in a hexagonal shape or a half-moon shape. The medical device 2 configured in this manner has the same effects as described above.

According to the present embodiment, an example of forming the inclined-surface portion (clip release mechanism) at the tip member fixed to the distal end side of the coil sheath and releasing the engagement between the clip and the link member by the link member abutting the inclined-surface portion of the distal member is described; however, the configuration according to the present disclosure is not limited thereto. For example, a clip release mechanism having a step with which the link member is contactable may be formed on the inner circumferential surface of the coil sheath, and the engagement between the clip and the link member may be released by the link member coming into contact with the clip release mechanism.

Several embodiments and modification examples of the present disclosure have been described above; however, the technical scope of the present disclosure is not limited to the embodiment and the application examples. The present disclosure is not limited to the above-described embodiments and is limited only by the accompanying claims.

What is claimed is:

1. A medical device, comprising:
   a clip unit;
   a wire configured to operate the clip unit;
   a link configured to connect the clip unit and the wire; and
   a sheath comprising an inclined surface portion into which the link is insertable,
   wherein:
      the link is configured to move in a proximal direction into the inclined surface portion so as to release the connection between the clip unit and the wire, and
      the sheath, the link, and the wire are configured to be fully separated from the clip unit after the connection between the wire and the clip unit is released.

2. The medical device according to claim 1, wherein a force required to release the connection between the clip unit and the wire is less than a force required to lock the clip unit to a holding tube in a state in which the clip unit grasps a target tissue.

3. The medical device according to claim 1, wherein:
   the inclined surface portion has an inner diameter, and
   the link is configured to be moved into contact with an inner circumferential surface of the inclined surface portion so as to release the connection between the clip unit and the wire.

4. The medical device according to claim 3, wherein the link is configured to be deformed when moved into contact with the inner circumferential surface to release the connection between the clip unit and the wire.

5. The medical device according to claim 4, wherein the link is configured to be deformed when moved into contact with the inner circumferential surface such that a distal end portion of the link rotates outwardly with respect to a longitudinal axis of the wire to disconnect the clip unit from the wire.

6. The medical device according to claim 1, wherein the inclined surface portion has a reduced inner diameter towards a proximal end.

7. The medical device according to claim 1, wherein:
   the sheath a coil sheath, and
   the inclined surface portion is a tube connected to the sheath.

8. The medical device according to claim 1, wherein:
   the clip unit includes an arm member,
   the link includes a first hook and a second hook, and
   the arm member is positioned between the first hook and the second hook in a radial direction of the wire.

9. The medical device according to claim 8, wherein the first hook and the second hook are configured to open radially outward when the link is inserted into the inclined surface portion so as to release the connection between the clip unit and the wire.

10. The medical device according to claim 9, wherein:
    the first hook is configured to open radially outward by pivoting around a first pivot axis on the link, and
    the second hook is configured to open radially outward by pivoting around a second pivot axis on the link.

11. The medical device according to claim 10, wherein:
    the first pivot axis extends through a first deformation portion, and
    the second pivot axis extends through a second deformation portion.

12. The medical device according to claim 11, wherein:
    the link includes a first tail and a second tail,
    the first deformation portion is positioned between the first hook and the first tail in a longitudinal direction, and
    the second deformation portion is positioned between the second hook and the second tail in the longitudinal direction.

13. The medical device according to claim 12, wherein:
    the inclined surface portion has an inner diameter,
    the first tail is configured to be moved into contact with an inner circumferential surface of the inclined surface portion so that the first hook releases the connection between the clip unit and the wire, and
    the second tail is configured to be moved into contact with the inner circumferential surface of the inclined surface portion so that the second hook releases the connection between the clip unit and the wire.

14. The medical device according to claim 1, wherein the link is configured to open radially outward when the link is inserted into the inclined surface portion so as to release the connection between the clip unit and the wire.

15. The medical device according to claim 14, wherein the link is configured to open radially outward by pivoting around a pivot axis on the link.

16. The medical device according to claim 1, wherein the clip unit includes:
    an arm member,
    a tube configured to accommodate the arm member, and
    an elastic member accommodated in the tube and configured to apply a force to the arm member at a distal end.

17. The medical device according to claim 11, wherein the clip unit further includes:
    a tube configured to accommodate the arm member, and
    an elastic member accommodated in the tube and configured to apply a force to the arm member at a distal end.

18. The medical device according to claim 1, wherein the link includes a pair of legs that are configured to open and close, and the link is configured to move from a first position, in which the legs are closed, to a second position that is proximal of the first position, wherein, in the second position, the links abuts the inclined surface portion such that the legs are opened to release the connection between the clip unit and the wire.

* * * * *